US010778983B2

(12) United States Patent
Chen et al.

(10) Patent No.: US 10,778,983 B2
(45) Date of Patent: Sep. 15, 2020

(54) PRESERVING TEXTURE/NOISE CONSISTENCY IN VIDEO CODECS

(71) Applicant: Dolby Laboratories Licensing Corporation, San Francisco, CA (US)

(72) Inventors: Qian Chen, San Jose, CA (US); Guan-Ming Su, Fremont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 57 days.

(21) Appl. No.: 15/763,039

(22) PCT Filed: Sep. 22, 2016

(86) PCT No.: PCT/US2016/053186
§ 371 (c)(1),
(2) Date: Mar. 23, 2018

(87) PCT Pub. No.: WO2017/053620
PCT Pub. Date: Mar. 30, 2017

(65) Prior Publication Data
US 2019/0058886 A1 Feb. 21, 2019

Related U.S. Application Data

(60) Provisional application No. 62/222,363, filed on Sep. 23, 2015.

(30) Foreign Application Priority Data

Nov. 4, 2015 (EP) .................................... 15193035

(51) Int. Cl.
*H04N 19/154* (2014.01)
*H04N 19/115* (2014.01)
(Continued)

(52) U.S. Cl.
CPC ......... *H04N 19/154* (2014.11); *H04N 19/115* (2014.11); *H04N 19/124* (2014.11);
(Continued)

(58) Field of Classification Search
None
See application file for complete search history.

(56) References Cited

U.S. PATENT DOCUMENTS

| 8,593,480 B1 | 11/2013 | Ballestad |
| 9,264,681 B2 | 2/2016 | Gish |
(Continued)

FOREIGN PATENT DOCUMENTS

| EP | 2675162 | 12/2013 |
| WO | 2012/147018 | 11/2012 |
(Continued)

OTHER PUBLICATIONS

Immerkaer, John "Fast Noise Variance Estimation" Computer Vision and Image Understanding, vol. 64, Issue 2, Sep. 1996, pp. 300-302.
(Continued)

*Primary Examiner* — Mohammed Jebari

(57) ABSTRACT

For each content-mapped frame of a scene, it is determined whether the content mapped frame is susceptible to object fragmentation with respect to texture in a homogeneous region based on statistical values derived from the content-mapped image and a source image mapped into the content-mapped image. The homogeneous region is a region of consistent texture in the source image. Based on a count of content-mapped frames susceptible to object fragmentation in homogeneous region, it is determined whether the scene is susceptible to object fragmentation in homogeneous region. If so, an upper limit for mapped codewords for a prediction function for predicting codewords of a predicted image from the mapped codewords in the content-mapped image is adjusted. Mapped codewords above the upper limit are clipped to the upper limit.

15 Claims, 10 Drawing Sheets

(51) Int. Cl.
  *H04N 19/169* (2014.01)
  *H04N 19/34* (2014.01)
  *H04N 19/86* (2014.01)
  *H04N 19/179* (2014.01)
  *H04N 19/30* (2014.01)
  *H04N 19/124* (2014.01)
  *H04N 19/172* (2014.01)
  *H04N 19/136* (2014.01)
  *H04L 29/06* (2006.01)

(52) U.S. Cl.
  CPC ......... *H04N 19/136* (2014.11); *H04N 19/172* (2014.11); *H04N 19/179* (2014.11); *H04N 19/1887* (2014.11); *H04N 19/30* (2014.11); *H04N 19/34* (2014.11); *H04N 19/86* (2014.11); *H04L 65/605* (2013.01)

(56) References Cited

U.S. PATENT DOCUMENTS

| | | | |
|---|---|---|---|
| 9,451,274 B2* | 9/2016 | Mertens | H04N 19/46 |
| 9,497,456 B2 | 11/2016 | Su | |
| 2013/0108183 A1* | 5/2013 | Bruls | G06T 9/004 382/233 |
| 2013/0148907 A1* | 6/2013 | Su | G06T 9/004 382/238 |
| 2014/0247869 A1* | 9/2014 | Su | H04N 19/30 375/240.03 |
| 2016/0014420 A1* | 1/2016 | Su | H04N 19/30 375/240.08 |
| 2018/0020224 A1 | 1/2018 | Su | |

FOREIGN PATENT DOCUMENTS

| | | |
|---|---|---|
| WO | 2014/160705 | 10/2014 |
| WO | 2014/204865 | 12/2014 |

OTHER PUBLICATIONS

Smpte ST 2084:2014 "High Dynamic Range Electro-Optical Transfer Function of Mastering Reference Displays" Aug. 16, 2014.

Segall, A. et al "Tone Mapping SEI" JVT Meeting Joint VideoTeam of ISO/IEC JTC1/SC29/WG11 and ITU-1 SG.16) Apr. 1, 2006.

Mai, Zicong et al "Optimizing a Tone Curve for Backward-Compatible High Dynamic Range Image and Video Compression" IEEE Transactions on Image Processing, vol. 20, No. 6, Jun. 1, 2011, pp. 1558-1571.

* cited by examiner determine whether each mapped frame of a scene is susceptible to object fragmentation based on statistical values derived from the mapped image and a corresponding source frame that is mapped into the mapped image 502 based on mapped images of the scene, determine whether the scene is of a scene category susceptible to object fragmentation in homogeneous region 504

If so, adjust an upper limit for mapped codewords in polynomials representing a prediction function 506

FIG. 5A receive a mapped image of a scene and prediction metadata defining polynomials that represent a prediction function 552 predict a predicted image based on polynomials with the upper limit 554 generate, based in part on the predicted image, a reconstructed image that represents a reconstructed version of the pre-mapped image 556

PRESERVING TEXTURE/NOISE CONSISTENCY IN VIDEO CODECS

TECHNOLOGY

The present invention relates generally to image processing, and in particular, to preserving texture/noise consistency in video codecs.

BACKGROUND

Video data may be transmitted in a backward-compatible multi-layer video signal. For example, a base layer of the multi-layer video signal may carry a video data portion of a standard dynamic range (SDR), whereas an enhancement layer of the multi-layer video signal may carry a remainder video data portion of an extended dynamic range (EDR) beyond the standard dynamic range. SDR image data in the base layer may be content-mapped from original EDR image data under the control of a colorist who, for example, may make changes in content mapping parameters such as lifts/gains/gamma values, etc., in content-mapping functions used to map the original EDR image data to the SDR image data to be encoded in the base layer.

However, the changes made by the colorist in the EDR-to-SDR content mappings may cause object segmentation/fragmentation—that is, a homogeneous object (say, the sky) may appear as multiple distinct objects—thus, causing segmentation/fragmentation artifacts in reconstructed EDR images generated by downstream devices from the multi-layer video signal. Homogeneous regions in original EDR images used to generate the multi-layer video signal may look segmented unnaturally in the reconstructed EDR images, thereby severely affecting perceptual qualities of the reconstructed EDR images. That is, homogeneous regions in the original EDR images that have consistent texture/noise may not have consistent texture/noise in the reconstructed EDR images, e.g., may look segmented into sub-regions with different texture/noise. Artifacts of this kind may be referred to as object segmentation artifacts, or inconsistent texture artifacts.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 5A and FIG. 5B illustrate example process flows; and

DESCRIPTION OF EXAMPLE EMBODIMENTS

Figure 1A:
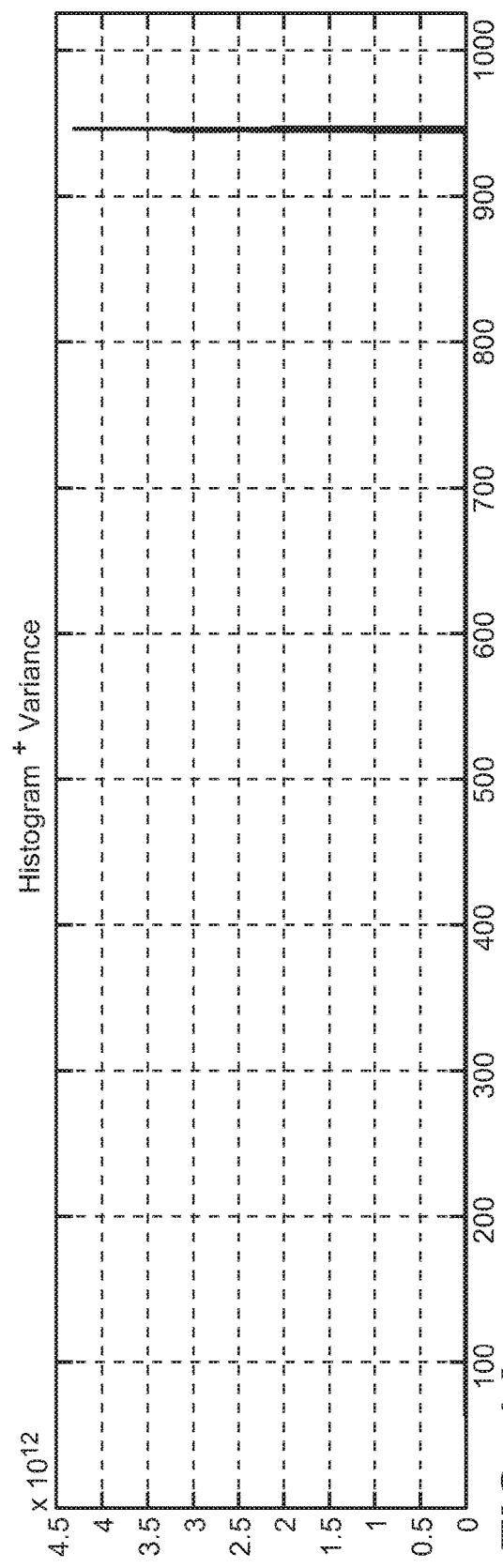
FIG. 1A and FIG. 1B illustrates an example residual energy plot and an example SDR to EDR scatter plot, respectively.

Example embodiments, which relate to preserving texture/noise consistency, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. MAPPING VIDEO CONTENT
3. TRIM PASS IMAGES
4. RESIDUAL ENERGY PEAKS
5. GRADIENTS AND NOISE ESTIMATION
6. TRIM PASS FOR SCENE
7. FRAME-BASED OPERATIONS
8. SCENE-BASED OPERATIONS
9. EXAMPLE VIDEO CODECS
10. EXAMPLE PROCESS FLOWS
11. IMPLEMENTATION MECHANISMS - HARDWARE OVERVIEW
12. EQUIVALENTS, EXTENSIONS, ALTERNATIVES AND MISCELLANEOUS

1. General Overview

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below.

In some embodiments, a source image may be of a relatively high dynamic range, such as an extended dynamic range represented in a 12-bit video signal, etc. An upstream video encoder may apply a content-mapping function (e.g., an EDR to SDR mapping, etc.) to the source image to generate a content-mapped image that is of a relatively narrow dynamic range, such as a standard dynamic range (SDR) supported by a wide variety of vision devices, media players, etc. In some embodiments, the content-mapping from the source EDR image to the SDR image can be controlled by a colorist, who, for example, may use trim pass tools to make changes/adjustments to configurable parameters (e.g., lifts, gains, gamma values, etc.) in the content-mapping function in order to generate an SDR image that can be rendered on a variety of SDR displays with a look intended by the colorist, a director, etc. The SDR image can then be encoded into a base layer (BL) video signal of a multi-layer video signal generated by the upstream video encoder.

In some embodiments, a plurality of segments in a piece-wise function may be used as a predictor, a prediction function, etc. For the purpose of illustration only, the plurality of segments of the piece-wise function may be a plurality of polynomial pieces (or polynomials) such as $2^{nd}$ order polynomial pieces, etc. That is, each polynomial piece (or polynomial) corresponds to a respective segment of the piece-wise function. The plurality of polynomial may be used as the predictor, the prediction function, etc., for the purpose of generating a predicted EDR image from the SDR content-mapped image. Parameters relating to offsets, polynomial coefficients, pivot points, etc., which define the plurality of polynomial pieces, may be determined by minimizing prediction errors between predicted EDR codewords (e.g., EDR pixel values) predicted based on the SDR content-mapped image and actual EDR codewords in the actual EDR image. These parameters defining the plurality of polynomial pieces can be passed as prediction parameters in the multi-layer video signal to downstream devices.

Differences/residuals computed between the predicted EDR image and the source EDR image may be derived and compressed/encoded into an enhancement layer (EL) video signal of the multi-layer video signal.

A downstream video decoder that receives the multi-layer video signal can generate a reconstructed EDR image (or a reconstructed version of the source EDR image) based on the content-mapped image decoded from the base layer video signal of the multi-layer video signal and the differences/residuals (e.g., in a residual image, etc.) decoded from the enhancement layer video signal of the multi-layer video signal. For example, the downstream video decoder can derive or reconstruct the same plurality of polynomial pieces used for prediction by the upstream video encoder based on the prediction metadata transmitted in the multi-layer video signal, and then uses the plurality of polynomial pieces to generate a predicted EDR image (e.g., the same predicted image generated by the upstream video encoder as discussed above, etc.) from the SDR content-mapped image decoded from the BL video signal of the multi-layer video signal. The predicted EDR image may be combined with the differences/residuals decoded from the EL video signal of the multi-layer video signal to generate the reconstructed EDR image.

In some embodiments, (e.g., default, etc.) pivot points can be defined/preconfigured over the standard dynamic range (e.g., a SDR codeword range, etc.) for the plurality of polynomial pieces. Each polynomial piece in the plurality of polynomial pieces may be a polynomial function defined over a respective codeword subrange delimited by two respective adjacent pivot points in the standard dynamic range. Such a polynomial piece can be used to generate predicted codewords (e.g., EDR codewords, etc.) of the relatively high dynamic range based on mapped codewords (e.g., SDR luminance codewords of a 10-bit or 8-bit video signal, etc.) in the SDR subrange (as delimited by the two adjacent pivot points).

In some embodiments, a first constant mapped codeword corresponding to the (very) first pivot point of all pivot points of the plurality of polynomial pieces represents the floor value (e.g., the lowest possible black level representable in the content-mapped image, etc.) for all mapped codewords. In some embodiments, a second constant mapped codeword corresponding to the (very) last pivot point of all pivot points of the plurality of polynomial pieces represents the ceiling value (e.g., the highest possible bright level representable in the content-mapped image, etc.) for all mapped codewords. In other words, the ending (first and last) pivot points are respectively lower and upper limits for mapped codewords and can be used to clip codewords (e.g., during prediction operations and the like) not within the range between the lower and upper limits into the first and second constant mapped codewords represented by the ending pivot points.

Techniques as described herein can be used to preserve texture/noise consistency of the source image in the reconstructed image and ensure a consistent look in homogeneous regions of the reconstructed image in relation to the look of homogeneous regions of the source image. As used herein, "homogeneous region" may refer to a region, an area, an image portion, etc., in an (e.g., original, source, etc.) image that is of a consistent and natural texture (e.g., a background, such as the sky). The homogeneous region may comprise pixel values (e.g., luminance codewords, codewords in a color channel of a color space, etc.) of various spatial frequencies. Some homogeneous regions may comprise little or no noise (e.g., with low or zero spatial frequencies). Some homogeneous regions may comprise (e.g., natural, consistent, naturally varying, etc.) textures with low, medium, high, or other spatial frequencies. Some homogeneous regions may relate to a given object or background in a scene.

In some embodiments, as a part of video encoding operations or video transcoding operations, information such as codeword count histograms, distributions of standard deviation (STD) values, residual energy distributions/histograms, estimated noise levels, noise measurements in highlight regions, histograms of gradients, etc., can be derived based on source codewords (e.g., EDR codewords, etc.) of each source image of a scene and mapped codewords (e.g., SDR codewords, etc.) of each corresponding content-mapped image of a scene. The derived information from each source image and each corresponding content-mapped image of the scene may be used to identify residual energy peaks corresponding to significant one-to-many mappings, noisy levels, highlight object boundaries and the like, at a frame level as well as at a scene level. At least some of the residual energy peaks corresponding to significant one-to-many mappings, noise levels, highlight object boundaries and the like, in the scene can be used to move the last pivot point to an appropriate point such that texture/noise consistency in the source image is preserved in the reconstructed image.

More specifically, by moving the last pivot point of the polynomial pieces, the upper limit for mapped codewords can be adaptively changed/shifted/set based on the information derived from the scene. The upper limit controls which source codeword subrange(s) in the source image that is/are clipped and placed—for example, as differences/residuals, etc.—in the EL video signal of the multi-layer video signal.

The last pivot point can be utilized so as to pass entire homogeneous regions in highlight portions of the source image, etc., or source codewords therein, to the EL video signal of the multi-layer video signal. For example, lowering the last pivot point from the default value (e.g., 235 for an 8-bit video signal, 940 for a 10-bit video signal, the largest value below reserve values as defined by a standard such as SMPTE, etc.) can be used to set up a highlight clipping during the prediction process of video encoding operations such that entire homogeneous regions in highlight portions of the source image, etc., or source codewords therein, are passed to the EL video signal of the multi-layer video signal. Since image information of the entire homogeneous regions in the highlight portions of the source image are provided to the EL video signal, same processing, compression, constraints, etc., are applied to the image information of the entire homogeneous regions in the highlight portions of the source image to generate the EL video signal. As a result, the EL video signal, when used to generate a reconstructed version of the source images by downstream devices, generates homogenous regions in highlight portions of reconstructed images that look consistent with the homogenous regions in the highlight portions of the source images.

In some example embodiments, mechanisms as described herein form a part of a media processing system, including but not limited to any of: media server, media production system, camera systems, home-based systems, communication devices, video processing system, video codec system, studio system, streaming server, cloud-based content service system, mobile device, video game devices, display device, media player, a handheld device, game machine, television, laptop computer, netbook computer, tablet computer, cellular radiotelephone, electronic book reader, point of sale terminal, desktop computer, computer workstation, computer server, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Mapping Video Content

Techniques as described herein can be used to support coding operations (e.g., encoding, decoding, transcoding, etc.) for video signals (e.g., coded bitstreams, etc.) that comprise at least one layer (e.g., dual layer, multi-layer, a combination of a base layer and one or more enhancement layers, etc.). These techniques may be implemented with software, hardware, a combination of software and hardware, and may be adopted by a variety of computing devices, multimedia devices, mobile devices, etc. At least some of the techniques may be packaged as one or more technical feature profiles (e.g., a mobile profile, a tablet profile, a home entertainment system profile, etc.), which can be released independently or in combination to other vendors, developers, manufacturers, etc.

A video codec as described herein may be used to support one or more of backward compatible (BC) video applications, etc. Examples of systems with such a video codec may include, but are not limited to only, any of: a single-layer 12-bit codec, a dual-layer 8-bit codec, a multi-layer codec, a backward compatible codec, a codec implementing a set of settings/requirements/options in Advanced Video Coding (AVC), a codec implementing a set of settings/requirements/options in High Efficiency Video Coding (HEVC), etc.

Some examples of backward compatible codecs are described in PCT Patent Application No. PCT/US2012/062932, filed on Nov. 1, 2012, owned by the assignee of the present application, the contents of which are incorporated by reference for all purposes as if fully set forth herein.

A source video package for a media program can be of a relatively large file size as the source video package may comprise source video content with relatively high spatial resolution (e.g., 4 k, 8 k, etc.), relatively large dynamic range, relatively wide color gamut. In some embodiments, source video content that has been encoded in a relatively high bit depth video signal (e.g., 12-bit video signal, 14+ bit video signal, etc.) may be transcoded into encoded video content of a much smaller size based at least in part on adaptive content mapping. Some examples of content mapping are described in U.S. Pat. No. 8,593,480, entitled "Method and Apparatus for Image Data Transformation," filed on Aug. 12, 2013, owned by the assignee of the present application, the contents of which are incorporated by reference for all purposes as if fully set forth herein.

For example, the source content may be encoded in a 12-bit PQ video signal with source codewords that correspond to (e.g., fixed, etc.) luminance-related or chroma-related values from image to image, from scene to scene, from media program to media program, etc.

The term "PQ" as used herein refers to perceptual luminance amplitude quantization. The human visual system responds to increasing light levels in a very non-linear way. A human's ability to see a stimulus is affected by the luminance of that stimulus, the size of the stimulus, the spatial frequencies making up the stimulus, and the luminance level that the eyes have adapted to at the particular moment one is viewing the stimulus. In an embodiment, a perceptual quantizer function maps linear input gray levels to output gray levels that better match the contrast sensitivity thresholds in the human visual system. Examples of PQ mapping functions (or EOTFs) are described in SMPTE ST 2084:2014 "High Dynamic Range EOTF of Mastering Reference Displays," which is incorporated herein by reference in its entirety, where given a fixed stimulus size, for every luminance level (i.e., the stimulus level), a minimum visible contrast step at that luminance level is selected according to the most sensitive adaptation level and the most sensitive spatial frequency (according to HVS models). Compared to the traditional gamma curve, which represents the response curve of a physical cathode ray tube (CRT) device and coincidentally may have a very rough similarity to the way the human visual system responds, a PQ curve imitates the true visual response of the human visual system using a relatively simple functional model.

The source content encoded in the 12-bit PQ video signal may have a relatively high dynamic range such as a dynamic range up to 12,000 nits, etc. In contrast, the encoded video content may be encoded in a 10-bit video signal or an 8-bit video signal with adaptively mapped codewords that do not necessarily correspond to fixed luminance-related or chroma-related values from image to image, from scene to scene, from media program to media program, etc. The adaptively mapped codewords in a 10-bit codeword space or a 8-bit codeword space may be (e.g., adaptively, etc.) mapped to the source codewords in a 12-bit codeword space based on an content-mapping function that can vary from image to image, from scene to scene, from media program to media program, etc. The content-mapping function may be represented by one or more of quantization curves, lookup tables (LUTs), codeword mappings, etc.

In some embodiments, a limited number of relatively simple mathematical functions or function segments, such as polynomials, piecewise linear (PWL) segments, etc., may be used as a predictor, a prediction function, etc., used to generate predicted EDR images based on content-mapped images. For example, the predictor, the prediction function, etc., can be represented by a limited number (e.g., 4, 8, 12, a different positive integer number greater than one, etc.) of polynomial pieces. The polynomial pieces may be polynomial functions (e.g., linear, $2^{nd}$ order, etc.) with a limited number of bits for each coefficient and with minimized approximation errors.

Some examples of using function segments, such as polynomials or polynomial pieces, etc., to represent a predictor, a prediction function, etc., are described in U.S. Provisional Patent Application No. 62/136,402, filed on Mar. 20, 2015, owned by the assignee of the present application, the content of which are incorporated by reference for all purposes as if fully set forth herein.

TABLE 1 illustrates example pivot point parameters for polynomial pieces used to represent a predictor, a prediction function, etc. The first column ("Piece Index") of TABLE 1 contains indices of polynomial pieces. The second column ("Piece Starting Point 8 bit") of TABLE 1 contains default starting points for corresponding polynomial pieces. The fourth column ("Piece Starting Point 10 bit") of Table 1 contains default starting points for corresponding polynomial pieces.

TABLE 1

| Piece Index | Piece Starting Point 8 bit | $\bar{b}$ range 8 bit | Piece Starting Point 10 bit | $\bar{b}$ range 10 bit |
| --- | --- | --- | --- | --- |
| 0 | 0   | [0, 31]    | 0   | [0, 127]    |
| 1 | 32  | [32, 63]   | 128 | [128, 255]  |
| 2 | 64  | [64, 95]   | 256 | [256, 383]  |
| 3 | 96  | [96, 127]  | 384 | [384, 511]  |
| 4 | 128 | [128, 159] | 512 | [512, 639]  |
| 5 | 160 | [160, 191] | 640 | [640, 767]  |
| 6 | 192 | [192, 223] | 768 | [768, 895]  |
| 7 | 224 | [224, 255] | 896 | [896, 1023] |

Under techniques as described herein, the last pivot points for polynomial pieces can be set to optimal values, which are covariant with image content in source images and content-mapping parameters (e.g., lifts/offsets such as additive constants, gains/slopes such as multiplier factors, gamma values such as exponents in power functions, etc.) used to derive content-mapped images. The moving/shifting of the last pivot points may be performed for some but not necessarily all source images, scenes, etc. Under techniques as described herein, decisions (denoted as trim-pass decisions) on whether and how to move the last pivot points for source images may be based on an adaptive algorithm that can adaptively make the trim pass decisions based on image content and content-mapping parameters used in connection with content mapping the source images into the content-mapped images in order to deliver a smooth appearance in homogeneous regions of reconstructed images corresponding to the source images.

3. Trim Pass Images

In some embodiments, the location of the maximum STD value in a distribution of STD values over SDR codewords—as derived from codeword mappings between an SDR frame and an EDR frame from which the SDR frame is obtained by content mapping—can be used to determine whether a SDR frame is a trim pass image/frame (e.g., whether the SDR frame has been content-mapped from an EDR frame by means of a trim pass tool or is likely to have been mapped from an EDR frame by means of a trim pass tool). In an example, if the maximum STD value is within a certain codeword subrange (e.g., 235 or more for 8-bit video signals, 940 or more for 10-bit video signals, etc.), then the SDR frame is a trim pass image.

Assume that there are P pixels in the entire j-th SDR frame and that each pixel may be represented by an SDR codeword (e.g., in luminance channel, etc.) with B bits. Denote the SDR codeword of the $i^{th}$ pixel in the j-th SDR frame as $s_{ji}$. Denote an EDR codeword of the corresponding $i^{th}$ pixel in the j-th EDR frame as $v_{ji}$. The j-th SDR frame may be derived from the j-th EDR frame by content mapping.

Let the set of all EDR pixels (in the j-th EDR frame) with EDR codewords mapped to an SDR codeword b in the j-th SDR frame be $\omega_{j,b}$, as shown in the following expression:

$$\omega_{j,b} = \{(j,i) | s_{ji} = b\} \quad (1)$$

A count histogram with each bin (denoted as $h_{j,b}$) indexed by a respective SDR codeword (b) can be created based on the j-th SDR frame and the j-th EDR frame. A bin ($h_{j,b}$) of the count histogram for the j-th SDR frame contains the number of elements in the set $\omega_{j,b}$, as shown in the following expression:

$$h_{j,b} = |\omega_{j,b}| \quad (2)$$

The standard deviation in each bin of the count histogram can be calculated as shown in the following expressions:

$$m_{jb} = \frac{\sum_{(j,i) \in \omega_{j,b}} v_{ji}}{h_{j,b}} \quad (3)$$

$$e_{j,b} = \sum_{(j,i) \in \omega_{j,b}} (v_{ji} - m_{jb})^2 \quad (4)$$

$$\bar{s}_{j,b} = \sqrt{\frac{e_{j,b}}{h_{j,b}}} \quad (5)$$

where $m_{jb}$ is the mean EDR value in the bin of the count histogram for the SDR codeword b, $\bar{s}_{j,b}$ is the standard deviation in the bin of the count histogram for the SDR codeword b.

The maximum STD value or the peak of STD over all SDR codewords can be identified as shown in the following expression:

$$S_j = \max_b \{\bar{s}_{j,b}\} \quad (6)$$

In some embodiments, if $S_j$ (e.g., the SDR codeword b corresponding to $S_j$, or for which $S_j$ is attained) falls into a specific high subrange of SDR such as an SMPTE subrange (e.g., $S_j \in [232,238]$ for 8-bit video signals, $S_j \in [932,948]$ for 10-bit video signals, etc.), then the SDR frame is determined as a trim pass image.

In scenarios in which an EDR frame such as the j-th EDR frame may have been clipped in a high subrange of EDR, a corresponding SDR frame such as the j-th SDR frame may also be clipped in the specific high subrange of SDR. In these scenarios, a STD value as computed with expression (5) for an SDR codeword in the specific high subrange may be relatively low or even zero. As a result, such an SDR frame may not be detected as a trim pass image in the absence of the maximum STD value in the specific high subrange.

In some embodiments, apart from determining whether the j-th SDR frame is a trim pass image based on the maximum STD value or the peak of STD as discussed, a further determination whether the j-th SDR frame is a special trim pass image is made based at least on the location of the peak count in the count histogram. If the j-th SDR frame is determined to be a trim pass frame based on the location of the peak in the count histogram, it may be said to be a special trim pass frame. The peak count in the count histogram can be identified as shown in the following expression:

$$H_j = \max_b \{h_{j,b}\} \tag{7}$$

If the peak count (e.g., the SDR codeword b corresponding to the peak count, or for which the peak count is attained) is located in the specific high subrange of SDR (e.g., $H_j \in [232,238]$ for 8-bit video signals, $H_j \in [932,948]$ for 10-bit video signals, etc.), the j-th SDR frame is determined as a trim pass image. Such a trim pass frame is further indicated as "a special trim pass image" to differentiate from a (non-special) trim pass image detected from the distribution of STD values.

Accordingly, whether the SDR frame is a trim pass frame (e.g., special trim pass frame) is determined based at least in part on the one or more statistical values. For example, whether the SDR frame is a trim pass frame (e.g., special trim pass frame) may be determined based on a count histogram and/or standard deviation values for the bins of the count histogram. In some exemplary embodiments, whether the SDR frame is a trim pass frame (e.g., special trim pass frame) may be determined based on a location of the peak of the standard deviation values over all SDR codewords and/or a location of a peak count of the count histogram.

4. Residual Energy Peaks

The variance (denoted as $\bar{e}_{j,b}$) in each bin (for each SDR codeword b) of the count histogram can be calculated as shown in the following expression:

$$\bar{e}_{j,b} = \frac{e_{j,b}}{h_{j,b}} \tag{8}$$

where $h_{j,b}$ and $e_{j,b}$ are given in expressions (2) and (4), respectively. Conversely, the residual energy $e_{j,b}$ in each SDR codeword b is related to the variance $\bar{e}_{j,b}$ as shown in the following expression:

$$e_{j,b} = \bar{e}_{j,b} \cdot h_{j,b} \tag{9}$$

A residual energy histogram may be formed by residual energies for all SDR codewords with each bin of the residual energy histogram as given by expression (4) or (9). That is, the residual energy histogram may indicate, for each SDR codeword, the residual energy (e.g., sum of individual residual energies) of all pixels in the EDR frame for which the respective EDR codeword has been mapped to the SDR codeword. In some embodiments, the residual energy histogram may provide a better indication of where the energy concentrates in the EL image content than a variance histogram formed by variances for all SDR codewords with each bin of the variance histogram as given by expression (8). For example, a residual energy peak as detected from the residual energy histogram may suggest that there is large number of non-zero differences/residuals in the EL image content. The large number of non-zero differences/residuals in the EL image content further may indicate a relatively severe one-to-many mapping from an SDR codeword to EDR codewords.

A peak in a histogram or a distribution (e.g., a count histogram, residual energy histogram, a distribution of STD values, a histogram of gradients, etc.) as described herein can be detected with any of a variety of peak/valley detection methods. Example peak detection methods may include, but are not limited to, sequential searches, non-sequential searches, determining/detecting/searching for peaks among values above a configurable threshold value, etc.

Figure 1B:
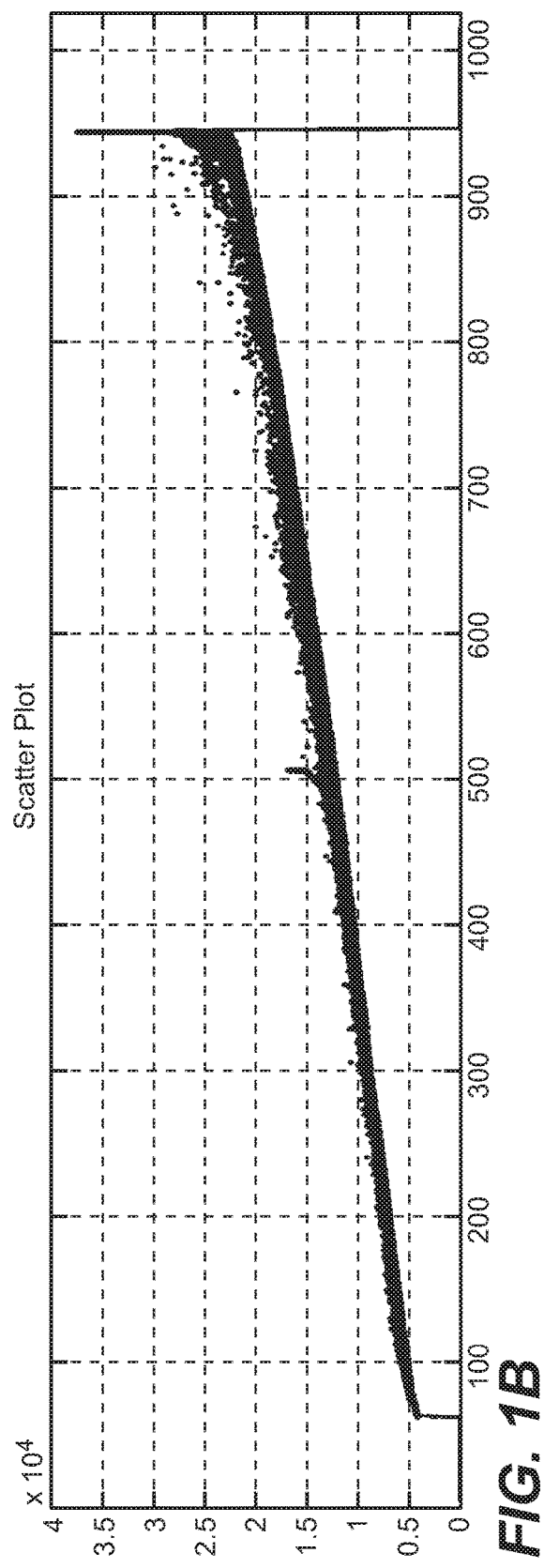

FIG. 1A illustrates an example residual energy plot ($e_{j,b}$). FIG. 1B illustrates an example SDR to EDR scatter plot. The x-axis in both plots represents SDR codewords. A peak in the residual energy plot of FIG. 1A indicates a significant one-to-many mapping in the scatter plot of FIG. 1B. The significant one-to-many mapping indicates possible poor prediction performance that could happen in generating a predicted EDR frame from a SDR frame, and indicates a potential high frequency image portion that may lead to inconsistent texture in reconstructed image content because a relatively small bitrate allocated to an EL video signal of a multi-layer video signal could not match a relatively large bitrate allocated to a BL video signal of the multi-layer video signal in representing the high frequency image portion. To avoid such inconsistent texture, a relatively high subrange of SDR in which the significant one-to-many mapping occurs may be (e.g., entirely) left for EL to represent instead of being represented by both EL and BL that have disparate bitrates and disparate capabilities in representing high frequency image content.

In some embodiments, residual energy peaks at SDR codewords in mid-tone and bright subranges of SDR can be identified from the residual energy histogram. These residual energy peaks may be used to set the last pivot point so that pixels with significant STD values in mid-tone and bright subranges of SDR above a SDR codeword represented by the last pivot point can be encoded in EL.

In some embodiments, residual energy peaks identified from a residual energy histogram as described herein, which indicates the shape of residual energy in SDR to EDR mappings between an SDR frame and a corresponding EDR frame, can be used to determine whether and how the last pivot point for mapping the EDR frame into the SDR frame should be shifted. In some embodiments, the residual energy peaks may be categorized or classified into residual energy shapes (or residual energy peak types) as follows:

TABLE 2

| Type | Residual Energy Shape |
| --- | --- |
| A | Single peak in highlight |
| B | Single peak in dark |
| C | Multiple peaks in highlight |
| D | Double peak, 1 highlight & 1 dark |
| E | 1 dominant peak in dark, 1 sub-peak in highlight |
| F | 1 dominant peak in highlight, 1 sub-peak in dark |

Type A denotes a residual energy shape of "single peak in highlight." In a frame of this type, a single residual energy peak occurs in a highlight region of SDR codewords. The highlight region of SDR codewords for type A may be made up of SDR codewords above a (e.g., user configurable, system configurable, content dependent, dynamic, preconfigured, etc.) highlight codeword threshold. This may be a frequently occurring type among trim pass frames. Type F denotes a residual energy shape of "1 dominant peak in highlight, 1 sub-peak (or non-dominant peak) in dark." Type F has some resemblance of type A. In some embodiments, the same pivot shift rule that is applied to type A may also be applied to type F. Therefore, both type A and type F may be combined into the residual energy shape of "single peak in highlight."

Type B denotes a residual energy shape of "single peak in dark." In some embodiment, low clipping (clipping codewords at or below the lower limit of SDR codewords) does not need pivot shift. To save computation power, no pivot shift is performed for frames with this type. In a type B frame, a single residual energy peak occurs in a (e.g., user configurable, system configurable, content dependent, dynamic, preconfigured, etc.) dark region of SDR codewords. The dark region of SDR codewords for type B may be made up of SDR codewords below a dark codeword threshold. Type E denotes a residual shape of "1 dominant peak in dark, 1 sub-peak (or non-dominant peak) in highlight," which resembles the residual energy shape of "single peak in dark." In some embodiments, type E is combined with type B; for example, pivot shift is not performed for frames of type E, similar to frames of type B.

Type C denotes a residual energy shape of "multiple peaks in highlight," which can be used to indicate a need for pivot shift. In a frame of this type, multiple residual energy peaks occur in a highlight region of SDR codewords. The highlight region of SDR codewords for type C may be made up of SDR codewords above a second (e.g., user configurable, system configurable, content dependent, dynamic, preconfigured, etc.) highlight codeword threshold. The second highlight codeword threshold may or may not be the same as the highlight codeword threshold for type A. Each of the peaks in this type may indicate a clipping in codeword mappings (e.g., content mapping, etc.) between SDR and EDR, and may correspond to a homogeneous region in an EDR frame. To avoid textual inconsistency, codewords in the homogeneous region should not be segmented or separated into two different layers (BL and EL). In some embodiments, the last pivot point is moved/shifted below the minimum residual energy peak in highlight so that EL is used to represent all detected possible homogeneous regions in highlight to avoid improper segmentation of homogeneous regions.

Type D denotes a residual energy shape of "double peaks," which has two comparable peaks, one in dark SDR codewords and the other in highlight (bright SDR codewords). This type of frames may be rare. In some embodiment, no pivot shift is performed for frames of type D. In accordance with the above, the SDR frame may be classified into a frame-level residual energy peak type in a plurality of frame-level residual energy peak types (e.g., types A through F), and the last pivot point (e.g., upper) can be adjusted based at least in part on the frame level residual energy peak type of the SDR frame.

5. Gradients and Noise Estimation

To reduce or avoid homogeneous area segmentations, if a residual energy histogram generated from an SDR frame and a corresponding EDR frame as described herein falls in the residual energy shape of "single peak in highlight," it may be further determined where the last pivot point should be shifted based at least in part on one or more of a histogram of gradient, a noise measurement, etc., as determined based on the SDR frame and the EDR frame.

If the noise measurement is high in the EDR frame, the same texture in a homogeneous area of the EDR frame may look very different unless the clipping boundary as represented by the last pivot point is set in such a way that the entire homogeneous area (e.g., a homogeneous textured object portrayed in the EDR frame, etc.) is to be represented by EL codewords. In some embodiments, an object boundary is identified for the homogeneous area, for example, using a boundary detection method based on a histogram of gradient (HoG); the last pivot point is adapted based at least in part on the object boundary so that the EL layer includes the entire homogeneous area.

For the $i^{th}$ pixel at the $j^{th}$ SDR frame with a SDR codeword $s_{ji}$, a gradient can be measured, for example, using a separable Prewitt filter in both horizontal and vertical directions as shown in the following expression:

$$G_h = [-1\ 0\ 1] \text{ and } G_v = \begin{bmatrix} -1 \\ 0 \\ 1 \end{bmatrix} \quad (10)$$

The gradient in each such pixel in the horizontal direction and the vertical direction may be derived as shown in the following expressions:

$$g_{ji}^h = s_{ji} \otimes G_h \quad (11\text{-}1)$$

$$g_{ji}^v = s_{ji} \otimes G_h \quad (11\text{-}2)$$

A magnitude of the gradient from both directions may be derived as shown in the following expression:

$$g_{ji} = \sqrt{(g_{ji}^v)^2 + (g_{ji}^h)^2} \quad (12)$$

A local moving average window such as a 3×3 window centering at the pixel $s_{ji}$ can be used to derive a locally smoothened gradient value as shown in the following expression:

$$\bar{g}_{ji} = \frac{\sum_{i \in \{3 \times 3\ window\}} g_{ji}}{9} \quad (13)$$

In some embodiments, pixels in any letter box present in the SDR frame and pixels near boundaries of any such letter box are removed. Pixels near letter box may be detected, for example, based on very high gradients—for example, gradients that are greater than a user/system configurable high gradient threshold—as caused by imposing pure dark constant pixel values on top of a natural image.

The normalized histogram of gradient can be calculated by summing up gradients of all pixels in the set of pixels with SDR codeword b; and then by dividing with the number of the pixels in the set, as shown in the following expression:

$$\tilde{G}_{j,b} = \frac{\sum_{(j,i) \in \omega_{j,b}} \bar{g}_{ji}}{h_{j,b}} \quad (14)$$

In some embodiments, jitters and noises in the normalized histogram of gradient can be removed by smoothening $\tilde{G}_{j,b}$, for example by using an N-tap median filter (e.g., a 5-tap median filter representing five samples in a moving box and the like), as shown in the following expression:

$$G_{j,b} = \text{median\_filter}(\tilde{G}_{j,b}) \quad (15)$$

The gradient peaks may be identified in the smoothened normalized histogram of gradient as given in expression (15). The gradient peaks may be denoted as shown in the following expression:

$$\{s_{j,q}^G\} \text{ for } Q \text{ peaks, where } q=0,1,\ldots,Q-1 \quad (16)$$

In some embodiments, the last pivot point can be set to a gradient peak with the largest gradient value in between a lower gradient threshold $GT_L$ and a higher gradient threshold $GT_H$ among the gradient peaks, as shown in the following expression:

$$\hat{b}(j) = \arg\max\{s_{j,q}{}^G, \forall s_{j,q}{}^G \in [GT_L, GT_H]\} \quad (17)$$

where one or both of the lower gradient threshold $GT_L$ and the higher gradient threshold $GT_H$ may be programmatically/automatically determined, empirically set based on perceptual studies of reconstructed images with different settings of the lower gradient threshold $GT_L$ and the higher gradient threshold $GT_H$, user or system configurable, or image content dependent.

Figure 2A:
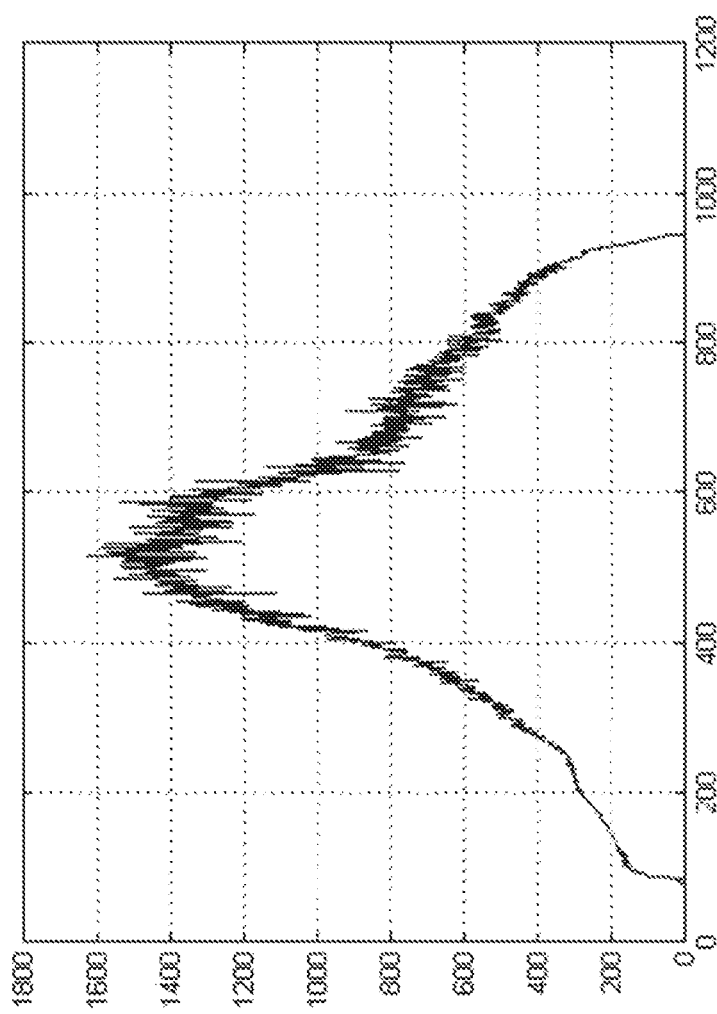
FIG. 2A and FIG. 2B illustrate example histograms of gradients.
Figure 2B:
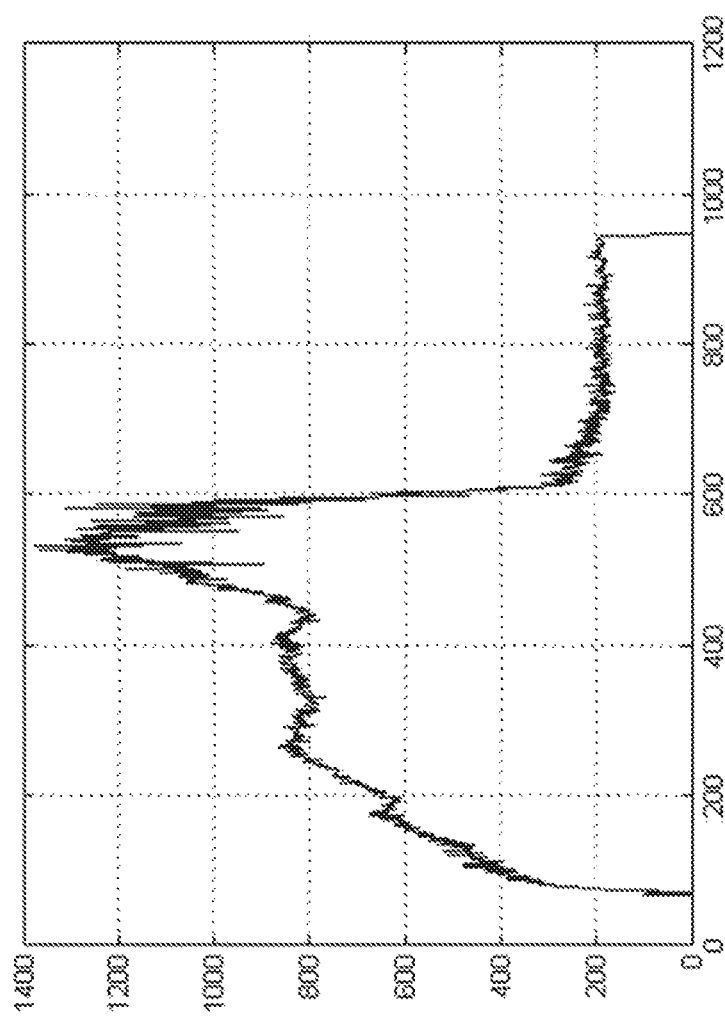

FIG. 2A and FIG. 2B illustrate two example HoGs obtained for two SDR frames, respectively. Peaks identified from these HoGs—for example between SRD codewords 400 and 600—may be used to indicate/determine object boundaries for homogeneous regions. These peaks may be used to shift the last pivot point so that the EL layer includes or encodes the entire homogeneous regions (e.g., in highlight).

Even though the HoG peak detection as described herein provides information about object boundaries useful for performing pivot shift operations, shifting the last pivot point to a pivot value derived from the HoG peak detection may lead to the last pivot point being over-shifted if (original) EDR image content in the homogeneous textured image areas/portions is clean (or with little or no noise) to begin with.

Under techniques as described herein, noise estimation/measurement may be performed with respect to the original EDR image content and used to determine whether the last pivot point should be shifted to a pivot value derived from the HoG peak detection.

A noise level for the i-th EDR pixel at the j-th EDR frame, $v_{ji}$, may be measured/estimated by first filtering pixels with a noise estimation filter such as a 3×3 window centering at pixel $v_{ji}$ (e.g., considering some or all of the neighboring pixels of pixel $v_{ji}$, such as left, right, top, bottom, top left, top right, bottom left and bottom right neighbors pixels) represented by a 2D filter (it should be noted that noise levels can be estimated with other noise estimation matrixes/techniques other than expression (18) in other embodiments) as shown in the following expression:

$$N = \begin{bmatrix} 1 & -2 & 1 \\ -2 & 4 & -2 \\ 1 & -2 & 1 \end{bmatrix} \quad (18)$$

Then the noise level (denoted as $n_{j1}$) for the i-th EDR pixel at the j-th EDR frame may be measured/estimated as an absolute value as shown in the following expression:

$$n_{ji} = |v_{ji} \otimes N| \quad (19)$$

Denote all SDR pixels with codewords no less than a threshold $T_N$ as a set $\Omega_j$, as shown in the following expression:

$$\Omega_j = \{i | s_{ji} \geq T_N\} \quad (20)$$

In some embodiments, to determine whether the last pivot point should be shifted to a candidate SDR codeword (denoted as $\hat{s}_j^e$), a noise measurement based on noise levels of SDR codewords above the candidate SDR codeword $\hat{s}_j^e$ may be made. In some embodiments, $T_N$ may be set to $\hat{s}_j^e$.

True edges such as object boundaries, etc., may have pixels of high noise levels that should not be used as a part of noise estimation for homogeneous regions. To remove the impact from the true edges in the noise estimation as described herein, a gradient map such as represented by a HoG, etc., may be used to mask out pixels with relatively high noise levels, for example above a gradient threshold $G_{TE}$. The gradient threshold $G_{TE}$ may be programmatically or automatically determined, empirically set based on perceptual studies of reconstructed images with different settings of the gradient threshold $G_{TE}$, user or system configurable, or image content dependent. In a non-limiting implementation example, the gradient threshold $G_{TE}$ is set to 25 is to distinguish true edges from noise levels associated with pixels in homogeneous regions. Therefore, a binary mask can be applied to $n_{ji}$, in which the binary mask has a value of 1 for pixels with $\bar{g}_{ji} < 25$ and has a value of 0 for any other pixels.

Additionally, optionally, or alternatively, pixels within any letterbox (which may be detected by gradients as previously discussed) may be removed from noise estimation of homogeneous regions.

Denote all pixels in the non-letterbox areas in the j-th SDR frame as a set $\Omega'_j$. Pixels for which the average noise estimation is to be made may be given as all the pixels of the set $\Omega'_j$ whose gradients are greater than the gradient threshold $G_{TE}$ (in this example, 25) but no less than $\hat{b}(j)$ as given in expression (17), as shown in the following expression:

$$\Omega''_j = \{(j,i) | \bar{g}_{ji} < 25, s_{ji} \geq \hat{b}(j) \in \Omega'_j\} \quad (21)$$

The noise measurement for the j-th SDR frame can be computed based on noise levels (in expression (19)) computed for the corresponding j-th EDR frame as shown in the following expression:

$$\bar{\sigma}_j = \frac{\sum_{i \in \Omega''_j} n_{ji}}{|\Omega''_j|} \quad (22)$$

The noise measurement $\bar{\sigma}_j$ above may be used as a factor to determine (e.g., in a scene-based decision) whether and how the last pivot point should be shifted, for example, based on information derived from the HoG peak detection, etc.

6. Trim Pass for Scene

Individual frames in a scene may have different trim pass flags and different last pivot values. In some embodiments, in order to deliver consistent visual quality at a temporal level from frame to frame, a scene-based trim pass decision is made so that the same last pivot point (value) is applied to every single frame in the entire scene. Assume that among N frames in a scene, n of the N frames are trim pass frames. A minimum n may be set/determined to qualify the scene as a trim pass scene. In some embodiments, such a minimum n is one (1), which means that in these embodiments as long as there is one trim pass frame in the scene, the entire scene is a trim pass scene. In some other embodiments, such a minimum n may be greater than one (1), which means that in these embodiments, the entire scene is a trim pass scene if a count of trim pass frames in the scene is no less than the minimum n (e.g., 2, 3, 5, etc.).

In some embodiments, special trim pass frames are much fewer in a scene than other frames in the same scene. In some embodiments, a trim pass scene is a special trim pass scene only if all trim pass frames detected in the trim pass scene are frames with special trim pass flags set to true (or 1).

Assume further that among N frames in a trim pass scene, m of them are of the residual energy shape of "single peak in highlight", n of them are of the residual energy shape of "multiple peaks in highlight". A determination may be made as to whether the trim pass scene is a scene type of "single peak in highlight" or a scene type of "multiple peaks in highlight."

Due to false detection and other interferences in residual energy peak detection, many scenes may be combinations of mixed types, with a dominant type most of the time. In some embodiments, if frames of a particular type (e.g., type A, type B, etc.) represent a majority of all frames of a trim pass scene, then the trim pass scene is set to a scene type of the particular type. For example, if m>0.5*N, the trim pass scene is of a scene type of "single peak in highlight"; otherwise if n>0.5*N, the trim pass scene is of a scene type of "multiple peaks in highlight." In some embodiments, for any scene not of one of these two scene types, no pivot shift is performed for the scene.

An average noise measurement $\bar{\sigma}$ can be computed over N frames in the scene, as shown in the following expression:

$$\bar{\sigma} = \frac{\sum_j \sigma_j}{N} \quad (23)$$

where $\sigma_j$ is the noise measurement for the j-th SDR frame.

An upstream video encoder as described herein may compare the average noise measurement $\bar{\sigma}$ of a scene with a noise threshold $\sigma_0$ to determine whether the scene is a noisy scene to which trim pass operations (or shifting the last pivot point) should be performed. In some embodiments, the noise threshold $\sigma_0$ may be empirically set, for example, based on perceptual studies of reconstructed images/frames with different settings of the noise threshold.

For example, if $\bar{\sigma} >= \sigma_0$, then the scene is a noisy scene that is visually sensitive to object segmentation in homogeneous regions.

If $\bar{\sigma} >= \sigma_0$, then the scene is a less noisy scene that may not be visually sensitive to object segmentation in homogeneous regions. In some embodiments, the last pivot is left unchanged (e.g., from a default value, a SMPTE specified value, a present value and the like) to avoid over-shifting the last pivot point.

For a trim pass scene of the "single peak in highlight" scene type, the last pivot point (e.g., for all images of the scene) may be set to an average HoG peak over N frames in the trim pass scene, which is given as shown in the following expression:

$$\bar{b} = \frac{\sum_j \hat{b}(j)}{N} \quad (24)$$

where $\hat{b}(j)$ is the HoG peak for the j-th SDR frame.

Figure 3A:
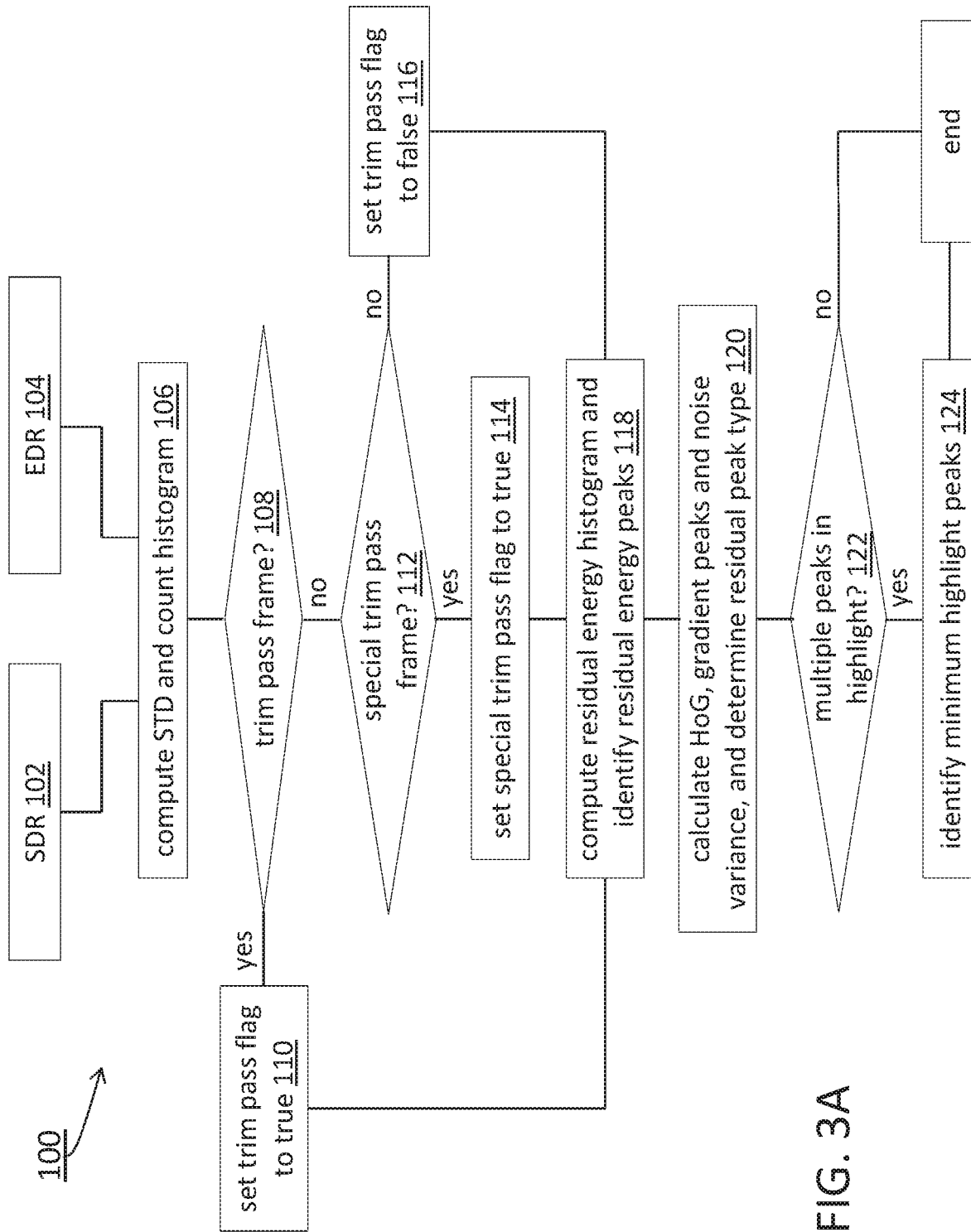
FIG. 3A illustrates an example frame-based process flow.

For a trim pass scene of the "multiple peaks in highlight" scene type, if the scene is a special trim pass scene, the minimum p of the minimum residual energy peaks $p_j$ for all frames (in the scene) of the "multiple peaks in highlight" frame type may be determined as shown in the following expression:

$$p = \min_{j \in \{\omega_m\}} \{p_j\} \quad (25)$$

where $\omega_m$ denotes the set of all frames (in the scene) of the "multiple peaks in highlight" frame type in the scene, and $p_j$ denotes the minimum residual peak for the j-th SDR frame as derived in block 124 of FIG. 3A.

A residual energy E at p can be determined based on the residual energy histograms of all the frames in the set $\omega_m$. The last pivot point for the special trim pass scene may be set to the closest position $p_{0.1}$ of on the left of p with a residual energy of 10%*E. The closest position $p_{0.1}$ may be given as shown in the following expression:

$$p_{0.1} = \min_i \{|p - p_i|, E(p_i) = 0.1 * E, p_i < p\} \quad (26)$$

where $|p-p_i|$ is the distance between p and each searched point $p_i$.

For a trim pass scene of the "multiple peaks in highlight" scene type, if the scene is not a special trim pass scene, the last pivot point for the special trim pass scene may be set to an average of the minimum residual energy peaks $p_j$ for all frames (in the scene) of the "multiple peaks in highlight" frame type, as shown in the following expression:

$$p = \frac{\sum_{j \in \{\omega_m\}} p_j}{|\omega_m|} \quad (27)$$

In some embodiments, the last pivot point as determined in expression (24), (26), (27), etc., may be further shifted down to the beginning codeword of a polynomial piece in which the last pivot point resides, as illustrated in TABLE 1. For instance, in an SDR (10 bit) to EDR prediction operation based on polynomial pieces as a predictor, assume the last pivot point $\hat{b}$, as determined in expression (24), (26), (27), etc., is 771. The last pivot point $\hat{b}$ resides in polynomial piece 6 with a corresponding starting codeword 768, as shown in TABLE 1. In some embodiments, the last pivot point is further shifted to the starting codeword or 768 in this example.

7. Frame-Based Operations

For the purpose of illustration only, a source image as described herein may be represented by an EDR frame, and a content-mapped image as described herein may be represented by an SDR frame. In some embodiments, an upstream video encoder as described herein may receive a sequence of SDR frames (or content-mapped images, etc.) and a sequence of EDR frames (or source images). In some embodiments, each SDR frame in the sequence of SDR frames corresponds to (e.g., derived through content mapping from, etc.) an EDR frame in the sequence of EDR frames. In some embodiments, the sequence of EDR frames represent source images decoded from a relatively large bit depth video signal, whereas the sequence of SDR frames represent content-mapped images that are generated by content mapping of the source images. A group among the sequence of frames may collectively represent a scene.

FIG. 3A illustrates an example frame-based process flow 100 for processing an SDR frame (in the sequence of SDR frames) and an EDR frame (in the sequence of EDR frames) to which the SDR frame corresponds.

The SDR frame may be of a relatively narrow dynamic range, whereas the EDR frame may be of a relatively wide dynamic range. The EDR frame may be used as a source image by the upstream video encoder to be mapped into the SDR frame. The SDR frame may comprise a plurality of SDR codewords representing SDR image content derived from the source image, whereas its corresponding EDR frame may comprise a plurality of EDR codewords representing relatively wide dynamic range image content. The plurality of SDR codewords may comprise SDR codewords of a component channel (e.g., Y channel, etc.) of a color space (e.g., YCbCr color space of a relatively low bit depth, etc.), whereas the plurality of EDR codewords may comprise EDR codewords of a corresponding component channel (e.g., Y channel, etc.) of a corresponding color space (e.g., YCbCr color space of a relatively high bit depth, etc.).

In some embodiments, a scene may be represented by a group of one or more SDR frames (102) in the sequence of SDR frames. The same scene may also be represented a group of one or more EDR frames (104), to which the one or more SDR frames (102) respectively correspond, in the sequence of EDR frames. The frame-based operations may be performed for each SDR frame of the one or more SDR frames (102) in the scene and each corresponding EDR frame in the one or more EDR frames (104) in the scene.

The SDR frame and the EDR frame as mentioned above may be denoted as j-th SDR frame and j-th EDR frame in the scene, where j is a non-negative integer.

In block 106, the upstream video encoder calculates a (codeword) count histogram comprising bins indexed by corresponding SDR codewords of the SDR frame. Each bin in the count histogram is indexed by a corresponding SDR codeword, and contains a count (or the total number) of all EDR codewords in the EDR frame that have been mapped or otherwise converted to the corresponding SDR codeword in the SDR frame, as given in expression (2).

Additionally, optionally, or alternatively, the upstream video encoder computes a standard deviation (STD) value (as given in expression (5)) in the EDR codewords mapped to the corresponding SDR codeword. STD values thus computed from all SDR codewords in the SDR frame can be used to form a distribution of STD values over SDR codewords.

In block 108, the upstream video encoder detects whether the STD frame is a trim pass image from the distribution of STD values. In response to detecting that the SDR frame is a trim pass image, the upstream video encoder sets a trim pass flag to true (or 1) in block 110 and the process flow (100) goes to block 118. Otherwise, the process flow (100) goes to block 112.

In block 112, in response to detecting that the SDR frame is not a trim pass image, the upstream video encoder sets the trim pass flag to false (or 0), and proceed to detect whether the SDR frame is a special trim pass image. In some embodiments, a special trim pass image can be detected from the count histogram instead of, or in addition to, the distribution of STD values. In response to detecting that the SDR frame is a special trim pass image, the upstream video encoder sets a special trim pass flag to true (or 1) in block 114 and the process flow (100) goes to block 118. Otherwise,
the upstream video encoder sets the special trim pass flag to false (or 0) in block 116 and the process flow (100) goes to block 118.

In block 118, the upstream video encoder calculates a residual energy histogram (e.g., as given by expression (4) or (9)) comprising bins indexed by corresponding SDR codewords of the SDR frame. Each bin in the residual energy histogram is indexed by a corresponding SDR codeword, and contains a product of the number of all EDR codewords in the EDR frame that have been mapped or otherwise converted to the corresponding SDR codeword in the SDR frame and a variance (or STD2) of all the EDR codewords in the EDR frame that have been mapped or otherwise converted to the corresponding SDR codeword in the SDR frame. The number of all EDR codewords in the EDR frame that have been mapped or otherwise converted to the corresponding SDR codeword in the SDR frame may be taken from or looked up in a bin (as indexed by the corresponding SDR codeword) of the count histogram.

Additionally, optionally, or alternatively, the upstream video encoder identifies zero, one, or more residual energy peaks from the residual energy histogram. In some embodiments, a residual energy peak is no less than a configurable (e.g., user-configurable, system-configurable, etc.) residual energy threshold.

In block 120, the upstream video encoder calculates a histogram of gradient (HoG) of the SDR frame, and identifies zero, one or more gradient peaks (as given in expression (16)) in the HoG of the SDR frame. Additionally, optionally, or alternatively, the upstream video encoder estimates a noise variance (or a noise measurement as given in expression (22)) in the EDR frame. In addition, the upstream video encoder categorizes the (residual energy) peaks (if any) detected in block 118 into one of a plurality of residual energy peak types. In some embodiments, the plurality of residual energy peak types includes, but is not limited to only, any of: "single peak in highlight," "multiple peaks in highlight," "single peak in dark," "double peaks," etc.

In block 122, the upstream video encoder determines whether the SDR frame is of the residual energy peak type of "multiple peaks in highlight." In response to determining that the SDR frame is not of the residual energy peak type of "multiple peaks in highlight", the process flow (100) ends.

In block 124, in response to determining that the SDR frame is of the residual energy peak type of "multiple peaks in highlight", the upstream video encoder finds (or identifies) the minimum highlight peak among the peaks detected in block 118 for the SDR frame, and the process flow (100) ends.

8. Scene-Based Operations

As used herein, the term "scene" for a video sequence (a sequence of frames/images) may relate to a series of consecutive frames in the video sequence sharing similar color and dynamic range characteristics. Because of the consecutive nature of video prediction in many video compression formats, some or all operational parameters related to video encoding and/or decoding may change only at boundaries such as scene changes or a beginning of a new group of pictures (GOP) representing a scene.

Trim pass decisions and related operations change mapping and prediction operations between SDR frames and corresponding EDR frames. In some embodiments, to avoid temporal instability from one frame to another frame in the same scene, trim pass decisions and related operations are scene-based. Thus, a trim pass decision and some or all operations related to decision may apply to all frames of the entire scene. It should be noted, however, that the trim pass decision can be based on frame-level information derived from frame-based operations such as those illustrated in FIG. 3A.

Figure 3B:
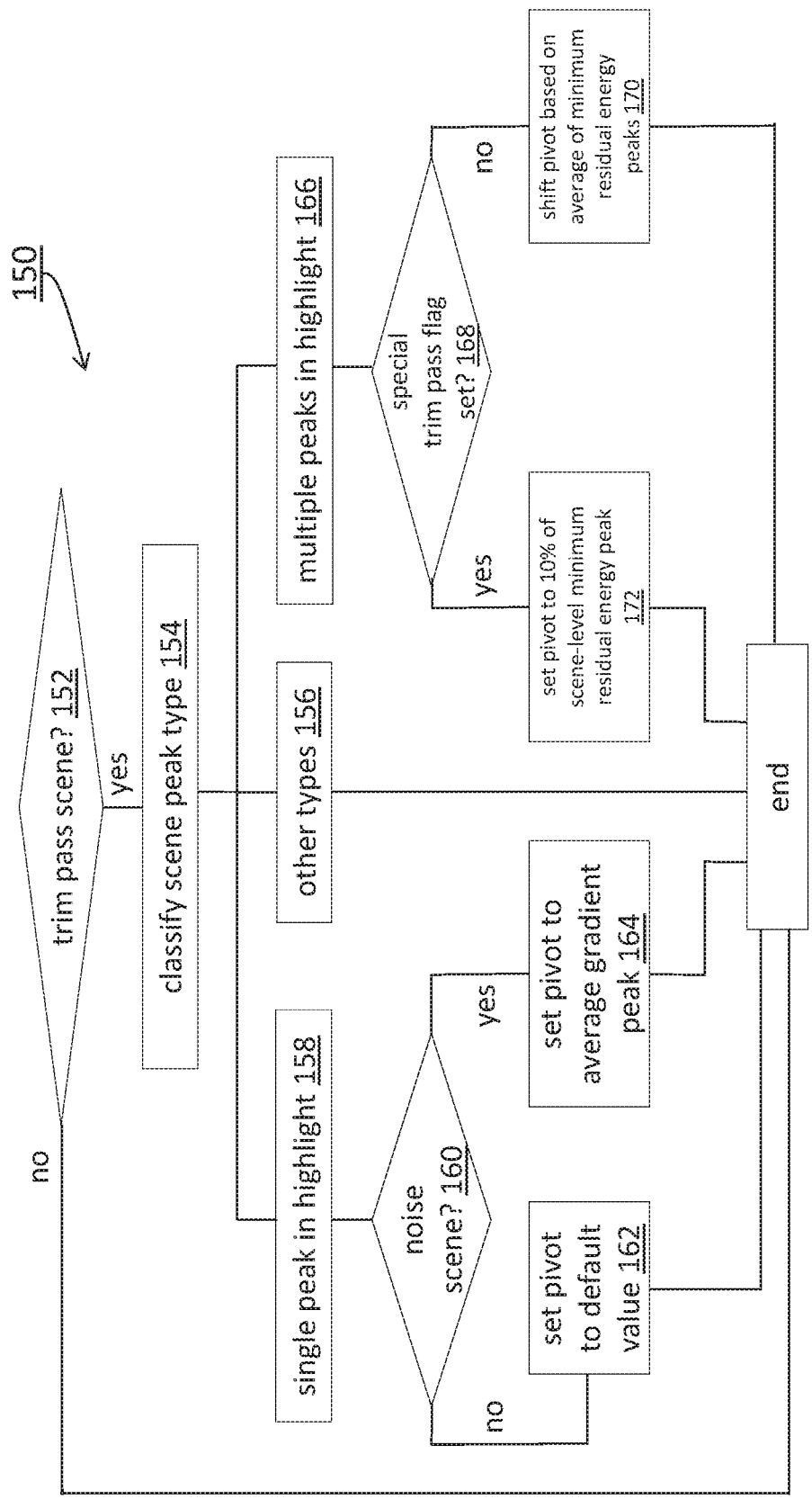
FIG. 3B illustrates an example scene-based process flow.

FIG. 3B illustrates an example scene-based process flow 150, which may be used to make a scene-based trim pass decision.

In block 152, the upstream video encoder determines whether the (current) scene is a trim pass scene. Determining whether a scene is a trim pass scene may be based on determining whether the scene contains one or more trim pass images. In some embodiments, if there is at least one trim pass image in the scene, the scene is determined or classified as a trim pass scene and the process flow (150) goes to block 154. Otherwise, the process flow (150) treats the scene as a non-trim-pass scene and terminates without performing further trim pass related operations.

If the scene is identified as a trim pass scene, the upstream video encoder may treat the last pivot point—of all the polynomial pieces representing a prediction function—as a trim pass pivot that may be shifted (e.g., from a default value, from a preset value, etc.). Any SDR codewords (e.g., luminance channel SDR codewords, etc.) that would be greater than the upper limit (or a ceiling value) represented by the last pivot point are clipped to the ceiling value (e.g., in prediction operations, in inverse mapping, etc.).

In block 154, in response to determining that the (current) scene is a trim pass scene, the upstream video encoder classifies the scene into one of a plurality of scene peak types based on residual energy types of the one or more SDR frames in the scene. In some embodiments, the plurality of scene peak types includes, but is not limited to only, any of: "single peak in highlight," "multiple peaks in highlight," "other types," etc.

In block 156, the upstream video encoder determines the scene peak type of the scene to be "other types," and terminates without performing further trim pass related operations.

In block 158, the upstream video encoder determines the scene peak type of the scene to be "single peak in highlight," and proceeds to calculate an average noise of the scene (e.g., as given in expression (23)).

In block 160, the upstream video encoder determines, based on the average noise of the scene, whether the scene is a noisy scene. In block 162, in response to determining that the scene is not a noisy scene, the upstream video encoder sets the last pivot point to a default value (e.g., 235, etc.).

In block 164, in response to determining that the scene is a noisy scene, the upstream video encoder calculates an average gradient peak of the scene and sets the last pivot point to the average gradient peak (e.g., as given in expression (24)) of the scene.

Additionally, optionally, or alternatively, the upstream video encoder moves the last pivot point to the beginning of the codeword subrange of the polynomial piece where the last pivot point (or the average gradient peak of the scene) resides. For instance, in an 8-piece polynomial representation (of a prediction function) with default starting points for corresponding polynomial pieces in the fourth column ("Piece Starting Point 10 bit") of Table 1 for 10-bit SDR signals, if the last pivot point denoted as $\hat{b}$ (or the average gradient peak of the scene) is 771, then the last pivot point resides in the default codeword subrange [768, 895] of the $6^{th}$ polynomial piece for 10-bit SDR signals. In some embodiments, the upstream video encoder moves the last pivot point to the starting codeword (768 in this example) of the default codeword subrange [768, 895] of the $6^{th}$ polynomial piece where the last pivot point resides. Similarly, in an 8-piece polynomial predictor with default starting points for corresponding polynomial pieces in the second column ("Piece Starting Point 8 bit") of Table 1 for 8-bit SDR signals, if the last pivot point denoted as b (or the average gradient peak of the scene) is 210, then the last pivot point resides in the default codeword subrange [192, 223] of the 6th polynomial piece for 8-bit SDR signals. In some embodiments, the upstream video encoder moves the last pivot point to the starting codeword (192 in this example) of the default codeword subrange [192, 223] of the $6^{th}$ polynomial piece where the last pivot point resides.

In block 166, the upstream video encoder determines the scene peak type of the scene to be "multiple peaks in highlight." In block 168, the upstream video encoder proceeds to determine whether a special trim pass flag for the scene is set to true (or 1).

In block 170, in response to determining that a special trim pass flag for the scene is set to false (or 0), the upstream video encoder calculates a pivot point shift of the scene based on an average (e.g., as given in expression (27)) of minimum residual energy peaks of trim pass images (which may include trim pass images and/or special trim pass images) of "multiple peaks in highlight" type in the scene, and shift the last pivot point by the pivot point shift (e.g., to the average of the minimum residual energy peaks of the trim pass images of "multiple peaks in highlight" type in the scene).

In block 172, in response to determining that a special trim pass flag for the scene is set to true (or 1), the upstream video encoder determines the minimum (or a scene-level minimum residual energy peak) of the minimum residual energy peaks of trim pass images (which may include trim pass images and/or special trim pass images) of "multiple peaks in highlight" type in the scene, and sets the last pivot point to the closest position (e.g., as given in expression (26)) with a certain percentage (e.g., 10%, etc.) of the scene-level minimum residual energy peak on the left of (smaller values relative to) the scene-level minimum residual energy peak.

9. Example Video Codecs

Figure 4A:
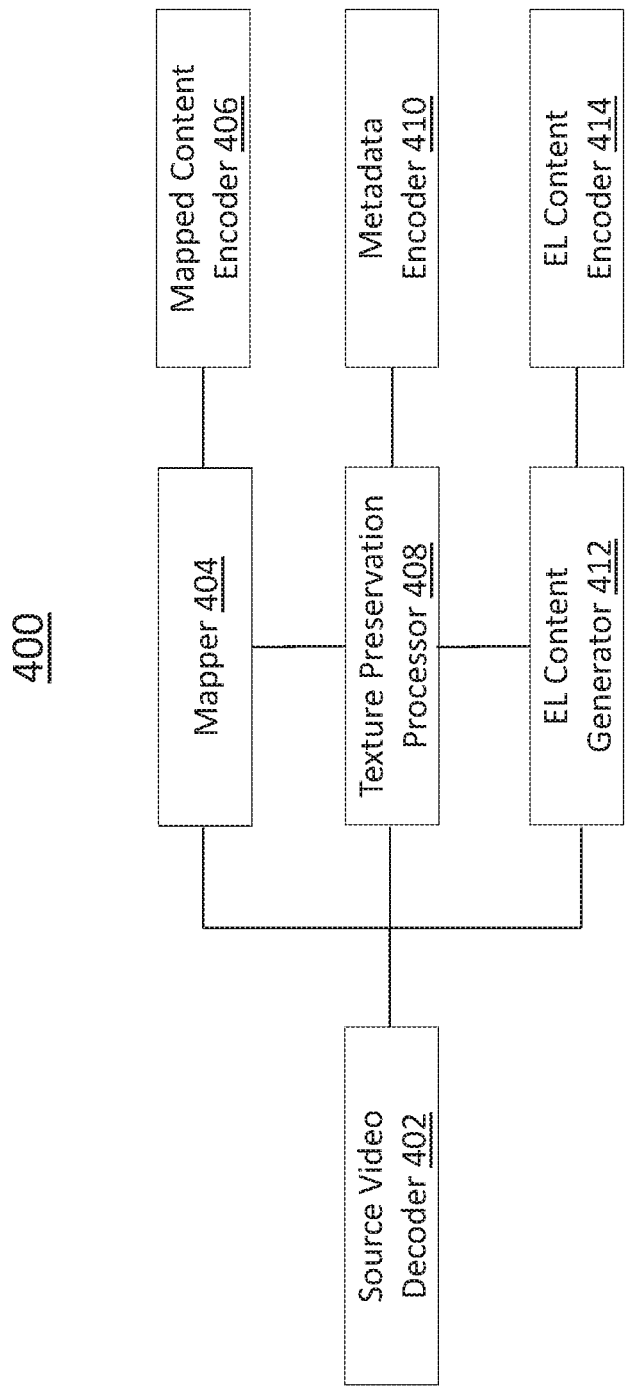
FIG. 4A and FIG. 4B illustrate example video codecs.
Figure 4B:
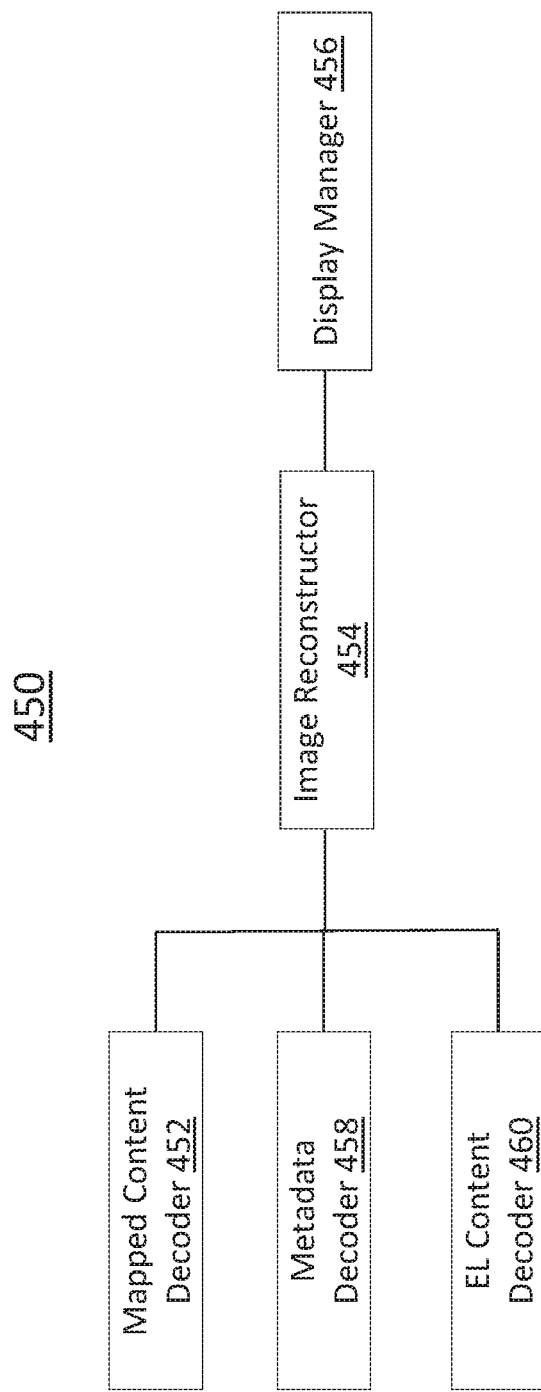

FIG. 4A illustrates an example video encoder 400 that can be used as an upstream device to deliver an output multi-layer video signal encoded with content-mapped video content, prediction metadata, EL content, etc., to downstream devices (one of which may be, for example, a video decoder 450 of FIG. 4B, etc.). The video encoder (400) may be implemented with one or more computing devices. In some embodiments, the video encoder (400) comprises a source content decoder 402, an adaptive content mapper 404, a mapped content encoder 406, a texture preservation processor 408, a metadata encoder 410, an EL content generator 412, an EL content encoder 414, etc.

In some embodiments, the source content decoder (402) comprises software, hardware, a combination of software and hardware, etc., configured to receive one or more source video signals (e.g., coded bitstreams, etc.), decode the source video signals into source video content (e.g., a sequence of EDR frames processed by FIG. 3A or FIG. 3B, etc.). In some embodiments, the source video content is decoded from a single layer video signal encoded with the source video content in a single layer. In some embodiments, the source video content is decoded from a multi-layer encoded video signal encoded with the source video content in more than one layer (e.g., a base layer and one or more enhancement layers, etc.).

In some embodiments, the adaptive content mapper (404) comprises software, hardware, a combination of software and hardware, etc., configured to carry out adaptive mapping operations on the source video content to generate mapped video content (e.g., a sequence of SDR frames processed by FIG. 3A or FIG. 3B, etc.). One or both of the source video content or the mapped content may be used for one or more of backward compatible (BC) video applications, etc.

In some embodiments, the adaptive content mapper (404) is configured to select and apply a content-mapping function to map source codewords in one or more images, one or more scenes, etc., represented in the source video content into mapped codewords in one or more corresponding images, one or more corresponding scenes, etc., represented in the content-mapped video content. Under techniques as described herein, the selection of the content-mapping function and/or adaptive content-mapping parameters used in the content-mapping function is adaptively made based on actual content in the images, scenes, etc., as represented in the source video content. Additionally, optionally, or alternatively, the selection of the content-mapping function and/or adaptive content-mapping parameters used in the content-mapping function may be adaptively made while these images, scenes, etc., are being processed by the video encoder (400).

In some embodiments, the adaptive content mapper (404) applies content-mapping operations on source codewords in source video content directly based on a selected content-mapping function with selected adaptive content-mapping parameters. In some embodiments, the content-mapping from the source EDR image to the SDR image can be controlled by a colorist, who, for example, may use trim pass tools to make changes/adjustments to configurable parameters (e.g., lifts, gains, gamma values, etc.) in the content-mapping function in order to generate an SDR image that can be rendered on a variety of SDR displays with a look intended by the colorist, a director, etc.

In some embodiments, the mapped content encoder (406) comprises software, hardware, a combination of software and hardware, etc., configured to encode the mapped video content into a mapped video signal (e.g., a dual layer 8-bit video signal encoded with the mapped video signal, a single layer 10-bit video signal encoded with the mapped video signal, etc.). The mapped video signal may be a BL video signal of the output multi-layer video signal generated by the video encoder (400).

In some embodiments, the texture preservation processor (408) comprises software, hardware, a combination of software and hardware, etc., configured to determine polynomial pieces with specifically determined coefficients (or prediction coefficients) that minimize prediction errors between a predicted image (e.g., a predicted EDR image, etc.) based on the polynomial pieces and an original image (e.g., an original EDR image, etc.). The texture preservation processor (408) may be configured to determine whether and how to shift the last pivot point as illustrated in FIG. 3A or FIG. 3B.

In some embodiments, the metadata encoder (410) comprises software, hardware, a combination of software and hardware, etc., configured to generate prediction metadata that contains the prediction coefficients of the polynomial pieces, to encode the prediction metadata as a part of overall metadata carried in the output multi-layer video signal, etc. The overall metadata may comprise some or all of operational parameters used in the operations of the video encoder (400) as a part of the output multi-layer video signal to a downstream device (e.g., the video decoder 450 of FIG. 4B, etc.). The operational parameters in the overall metadata transmitted to downstream devices include but are not limited to, any of: prediction coefficients, the non-linear quantization (NLQ) parameters, etc. The overall metadata may be a part of data carried in layers containing encoded video content, or in a separate sub-bitstream of an overall video bitstream, for example, as a part of supplemental enhancement information (SEI) or other similar metadata carriages available in the video bitstream. An example sub-bitstream may be a reference processing unit (RPU) stream developed by Dolby Laboratories, Inc.

In some embodiments, the EL content generator (412) comprises software, hardware, a combination of software and hardware, etc., configured to carry out EL content operations to generate EL video content. The EL content generator (412) may be configured to generate predicted video content (e.g., a sequence of predicted images from the sequence of SDR frames processed by FIG. 3A or FIG. 3B, etc.) based at least in part on the polynomial pieces that represent a prediction function used to generate predicted EDR video content based on the content-mapped SDR video content. The polynomial pieces map a mapped codeword in a set of available mapped codewords (e.g., SDR codewords, etc.) used to encode the mapped video content to a predicted codeword (e.g., a predicted EDR codeword, etc.). The last pivot point may be used to confine, keep or send image details in a relatively high subrange of the input dynamic range represented in the source video content into the EL video signal. The EL content generator (412) may be further configured to generate EL video content in the form of differences/residuals computed between the predicted video content and the source video content.

In some embodiments, the EL content encoder (414) comprises software, hardware, a combination of software and hardware, etc., configured to encode the EL video content into an EL video signal (e.g., a dual layer 8-bit video signal encoded with the content mapped video signal, a single layer 10-bit video signal encoded with the content mapped video signal, etc.). The EL video signal may be an EL video signal of the output multi-layer video signal generated by the video encoder (400).

As used herein, the term "bit depth" refers to the number of bits provided in a coding space that provides available codewords to encode or quantize image data; an example of low bit depth is 8 bits; an example of high bit depth is 12 bits or more.

As used herein video content may comprise a sequence of images or images. As used herein, a "source image" may refer to an image such as a scene-referred image captured by a high-end image acquisition device, a reference coded image, a PQ coded image, etc. A source image may comprise codewords available in a codeword space of a relatively large bit depth.

An image such as a source image, a content-mapped image, a reconstructed image, etc., may be in any color space. For example, a source image may be a 12+ bit image in an YCbCr color space, in an RGB color space, in an XYZ color space, in an YDzDx color space, in an IPT color space, etc. In an example, each pixel represented in an image comprises codewords for all channels (e.g., RGB channels, luma and chroma channels, XYZ channels, YDzDx channels, IPT channels, etc.) defined for a color space (e.g., an YCbCr color space, an RGB color space, an XYZ color space, an YDzDx color space, an IPT color space, etc.). Each codeword comprises upsampled or downs ampled codewords for one or more of the channels in the color space. In an example embodiment, the video encoder (400) is configured to perform color space transformation related to an image from a first color space (e.g., an RGB color space, etc.) to a second different color space (e.g., a YCbCr color space, etc.).

In an example embodiment, the video encoder (400) is configured to downsample or upsample an image in a first sampling format (e.g., in a 4:4:4 sampling format, etc.) to a second different sampling format (e.g., in a 4:2:0 sampling format, etc.).

Examples of a video encoder that implements signal content mapping and other operations include, but are not limited to only, any of: one or more single-layer 12-bit codecs, one or more dual-layer 8-bit codecs, one or more multi-layer codecs, one or more backward compatible codecs, one or more codecs implementing a set of settings/requirements/options in AVC, one or more codecs implementing a set of settings/requirements/options in HEVC, H.264/AVC/HEVC, MPEG-2, VP8, VC-1, etc.

FIG. 4B illustrates an example video decoder 450 that can be used as a downstream device to process an input multi-layer video signal generated by an upstream device such as the video encoder (400) of FIG. 4A, and encoded with content mapped video content, prediction metadata, EL video content, etc. The multi-layer video signal may comprise a BL video signal containing content mapped video content, an EL video signal containing EL video content. The video decoder (450) may be implemented with one or more computing devices. In some embodiments, the video decoder (450) comprises a mapped content decoder 452, a metadata decoder 458, an EL content decoder 460, an image reconstructor 454, a display manager 456, etc.

In some embodiments, the mapped content decoder (452) comprises software, hardware, a combination of software and hardware, etc., configured to decode the BL video signal into content mapped video content.

In some embodiments, the metadata decoder (458) comprises software, hardware, a combination of software and hardware, etc., configured to generate metadata including but not necessarily limited to prediction metadata from the input multi-layer video signal.

In some embodiments, the EL content decoder (460) comprises software, hardware, a combination of software and hardware, etc., configured to decode the EL video signal into EL video content.

In some embodiments, the image reconstructor (454) comprises software, hardware, a combination of software and hardware, etc., configured to carry out image reconstruction operations on the mapped video content (e.g., backward compatible SDR images, etc.) and EL video content (e.g., residual images generated between predicated images and original images, etc.) to generate reconstructed images/frame, which may be a reconstructed version of source video content used by an upstream device to generate the mapped video content.

In some embodiments, based on the prediction metadata, the image reconstructor (454) is configured to reconstruct polynomial pieces that represents a predictor for generating predicted EDR images based on SDR images. The video decoder (450), or the image reconstructor (454) therein, may be configured to generate predicted video content by applying prediction operations on content mapped video content originated from the video encoder as decoded from the content mapped video signal using the polynomial pieces. The video decoder (450), or the image reconstructor (454) therein, may be configured to combine the EL video content (e.g., differences/residuals between predicted video content and source video content in the video encoder (400)) and the predicted video content into a reconstructed version of the source video content processed by the video encoder (400).

In some embodiments, the display manager (456) comprises software, hardware, a combination of software and hardware, etc., configured to perform video processing operations such as display management operations, etc., on the reconstructed version of the source video content. Example display management operations may include, but are not limited to only, any of: tone mapping operations, clipping operations, color gamut adaptation operations, etc. Some or all of these operations may be device specific. Through these operations, images represented in the reconstructed version of the source video content can be rendered by a display device that may be a part of the same device that includes the video decoder (450), may be operating in conjunction with the video decoder (450), etc.

In an example embodiment, the video decoder (450) is configured to upsample or downsample an image in a first sampling format (e.g., in a 4:2:0 sampling format, etc.) to a second different sampling format (e.g., in a 4:4:4 sampling format, etc.).

Examples of a video decoder that implements prediction operations and other operations include, but are not limited to only, any of: one or more single-layer 12-bit codecs, one or more dual-layer 8-bit codecs, one or more multi-layer codecs, one or more backward compatible codecs, one or more codecs implementing a set of settings/requirements/options in AVC, one or more codecs implementing a set of settings/requirements/options in HEVC, H.264/AVC/HEVC, MPEG-2, VP8, VC-1, etc.

10. Example Process Flows

FIG. 5A illustrates an example process flow. The process flow may relate to a method of layered encoding. In some embodiments, one or more computing devices or components may perform this process flow. In block 502, a video encoder (e.g., 400 of FIG. 4A), for each content-mapped image in a group of content-mapped images that collectively represent a scene (e.g., in a group of content-mapped images among a series of consecutive content-mapped images in a video sequence), determines whether the content-mapped image is of a frame category susceptible to object fragmentation in a homogeneous region (e.g., with respect to texture and/or noise) based at least in part on one or more statistical values derived from the content-mapped image and a source (e.g., pre-content-mapped, etc.) image that is mapped into the content-mapped image, for example, content mapping operations that may be controlled at least in part by a user such as a colorist, a director, etc. The source image is of a dynamic range (e.g., EDR, etc.) higher than that (e.g., SDR, etc.) of the content-mapped image. The homogenous region may be a region of consistent texture in the source image. The homogeneous region may be a region in a highlights portion of the source image.

In block 504, the video encoder (400), based on a count of content-mapped images of the frame category susceptible to object fragmentation in homogeneous region among the group of content-mapped images, determining whether the scene is of a scene category susceptible to object fragmentation in homogeneous region. The scene may be determined to be of scene category susceptible to object fragmentation in a homogeneous region if a given number or more (e.g., more than a given threshold) of the content-mapped images of the scene are of the frame category susceptible to object fragmentation in homogeneous region.

In block 506, the video encoder (400), in response to determining that the scene is of the scene category susceptible to object fragmentation in homogeneous region, adjusting an upper limit for mapped codewords in a plurality of polynomials representing a predictor.

For example, an upper limit for mapped codewords for a prediction function for predicting codewords of a predicted image from the mapped codewords in the content-mapped image may be adjusted. Mapped codewords above the upper limit may be clipped to the upper limit. Predicted codewords for these mapped codewords may be equal to a ceiling value. The ceiling value may be equal to the predicted codeword for the upper limit. The prediction function may be a piece-wise prediction function. Segments of the piece-wise prediction function may be represented by the plurality of polynomials, each polynomial representing a respective segment.

The upper limit may be selected such that the entire homogeneous region is encoded in an enhancement layer of a multi-layer video signal. This measure may prevent object segmentation of the homogeneous region. The base layer may have encoded therein the series of consecutive content-mapped images, as described above. The enhancement layer may have encoded therein, for each content-mapped image among the series of consecutive content-mapped images, a difference image between the source image and the predicted image, as described above.

Accordingly, in some example embodiments, the video encoder (400) may be further configured to perform encoding the series of consecutive content-mapped images in the video sequence into a base layer of a multi-layer video signal. The video encoder (400) may be further configured to perform, for each content-mapped image in the series of content-mapped images, predicting a predicted image by applying the prediction function to the mapped codewords in the content-mapped image, and computing a difference image between the source image that has been mapped into the content-mapped image and the predicted image. The video encoder (400) may be further configured to perform encoding the computed difference images for the series of content-mapped images into an enhancement layer of the multi-layer video signal.

In some example embodiments, the content-mapped image is of a frame category susceptible to object fragmentation in the homogeneous region if the homogeneous region in a corresponding reconstructed image generated by a downstream device is likely to have inconsistent texture.

In an embodiment, the one or more statistical values comprise one or more of: a count histogram with bins each of contains a count of pre-mapped codewords (e.g., source codewords in the source image, etc.) for a mapped codeword, or a distribution of standard deviation values over mapped codewords.

In an embodiment, to determine whether the content-mapped image is of the frame category susceptible to object fragmentation in homogeneous region, the video encoder (400) is configured to determine whether the content-mapped image is a trim pass frame (e.g., special trim pass frame) based at least in part on the one or more statistical values.

In an embodiment, the video encoder (400) is further configured to perform: deriving a residual energy histogram from the content-mapped image and the source image; locating one or more residual energy peaks in the residual energy histogram; based on the one or more residual energy peaks in the residual energy histogram, classifying the content-mapped image into a frame-level residual energy peak type in a plurality of frame-level residual energy peak types; etc. The residual energy histogram may indicate, for each mapped codeword in the content-mapped image, the residual energy of all pre-mapped codewords for the mapped codeword. The video encoder (400) may be further configured to perform adjusting the upper limit for mapped codewords based at least in part on the frame level residual energy peak type of the content-mapped image.

In an embodiment, the plurality of frame-level residual energy peak types comprises one or more of: a frame type of single residual energy peak in highlight, a frame type of multiple residual energy peaks in highlight, a frame type of one residual energy peak in highlight and one residual energy peak in dark, a frame type of single residual energy peak in dark, etc.

In an embodiment, the video encoder (400) is further configured to classify the scene into a scene-level residual energy peak type in the plurality of scene-level residual energy peak types based on one or more frame-level residual energy peak types of content-mapped images in the group of content-mapped images.

In an embodiment, the plurality of scene-level residual energy peak types comprises one or more of: a scene type of a single residual energy peak in highlight, a scene type of multiple residual energy peaks in highlight, etc.

In an embodiment, the scene-level residual energy peak type corresponds to a frame-level residual energy peak type of a majority of content-mapped images in the group of content-mapped images.

In an embodiment, the video encoder (400) is further configured to perform: determining a noise estimation of homogeneous regions in the scene.

In an embodiment, the upper limit is represented by the last pivot point of all pivot points of the plurality of polynomials. The segments of the piece-wise prediction function may be delimited by respective adjacent ones among the pivot points. That is respective polynomials may represent the prediction function for content-mapped codewords between respective adjacent pivot points.

In an embodiment, the upper limit is adjusted from a preconfigured value for the plurality of polynomials to a value computed from one or more of: residual energy information as derived from the content-mapped image and the source image, gradient information as derived from at least one of the content-mapped image or the source image, etc.

In an embodiment, the upper limit is further adjusted from the computed value to a nearest preconfigured value below the computed value; the preconfigured value and the nearest preconfigured value below the computed value belong to a set of preconfigured values defined for the plurality of polynomials.

In an embodiment, the video encoder (400) is further configured to compute one or more of a noise measurement in highlight regions of at least one of the content-mapped image or the source image, a noise estimation of the scene, a histogram of gradients of at least one of the content-mapped image or the source image, etc.

In an embodiment, to adjust an upper limit for mapped codewords in a plurality of polynomials representing a prediction function, the video encoder (400) is configured to: determining whether the scene is of a scene type of single peak in highlight. In response to determining that the scene is of the scene type of single peak in highlight, the video encoder (400) is configured to perform: determining whether a noise estimation of the scene exceeds a noise threshold; in response to determining that the noise estimation of the scene exceeds the noise threshold, adjusting the upper limit to an average gradient peak of the scene (e.g., adjusting the upper limit to the average value of mapped codewords in the content-mapped images of the scene for which a gradient peak is attained); etc.

In an embodiment, to adjust an upper limit for mapped codewords in a plurality of polynomials representing a prediction function, the video encoder (400) is configured to: determining whether the scene is of a scene type of multiple peaks in highlight. In response to determining that the scene is of the scene type of multiple peaks in highlight, the video encoder (400) is configured to perform: determining whether the scene is a special trim pass scene. The scene may be said to be a special trim pass scene if all content-mapped images in the group of content-mapped images collectively representing the scene are special trim pass frames. A special trim pass frame in turn is a content-mapped image for which the peak count in a count histogram is in a specific sub-range (e.g., specific high sub-range) of mapped codewords in the content-mapped image. Each bin of the count histogram may contain a count of pre-mapped codewords for a mapped codeword. In response to determining that the scene is a special trim pass scene, the video encoder (400) is configured to perform: determining a scene-level minimum residual peak based on minimum residual energy peaks of content-mapped images of a frame type of multiple peaks in highlight in the scene; adjusting the upper limit to a closest mapped codeword at which a residual energy equals a specific percentage of the scene-level minimum residual energy peak, where the closest mapped codeword is smaller than a mapped codeword represented by the scene-level minimum residual energy peak; etc. The minimum residual energy peaks may be determined from a residual energy histogram that indicates, for each mapped codeword in the content-mapped image, the residual energy of all pre-mapped codewords for the mapped codeword.

In an embodiment, to adjust an upper limit for mapped codewords in a plurality of polynomials representing a prediction function, the video encoder (400) is configured to: determine whether the scene is of a scene type of multiple peaks in highlight. The scene may be said to be a special trim pass scene if all content-mapped images in the group of content-mapped images collectively representing the scene are special trim pass frames. A special trim pass frame in turn is a content-mapped image for which the peak count in a count histogram is in a specific sub-range (e.g., specific high sub-range) of mapped codewords in the content-mapped image. Each bin of the count histogram may contain a count of pre-mapped codewords for a mapped codeword. In response to the determination that the scene is of the scene type of multiple peaks in highlight, the video encoder (400) is configured to: determine whether the scene is a special trim pass scene; in response to the determination that the scene is not a special trim pass scene, adjusting the upper limit to an average of minimum residual energy peaks of content-mapped images of "multiple peaks in highlight" type in the scene; etc. The minimum residual energy peaks may be determined from a residual energy histogram that indicates, for each mapped codeword in the content-mapped image, the residual energy of all pre-mapped codewords for the mapped codeword.

In an embodiment, the upper limit is represented by a mapped codeword in a luminance-related channel of a color space.

In an embodiment, at least one of polynomial parameters defining the plurality of polynomials is dynamically determined while a sequence of content-mapped images including the group of content-mapped images is being processed for generating a multi-layer video signal.

In an embodiment, available mapped codewords used to represent content-mapped images are divided into one or more of: one or more dark codeword subranges, one or more mid-tone codeword subranges, one or more highlight codeword subranges, etc.

In an embodiment, a highlight codeword subrange of the one or more highlight codeword subranges comprises mapped codewords above a highlight codeword threshold associated with the highlight codeword subrange.

In an embodiment, the group of content-mapped images in the scene is encoded into a content-mapped video signal represented by one of an 8-bit video signal or a 10-bit video signal. In an embodiment, the content-mapped video signal is generated by at least one of: an advanced video coding (AVC) encoder, a Moving Picture Experts Group (MPEG)-2 encoder, or a High Efficiency Video Coding (HEVC) encoder.

In an embodiment, the source image is perceptually encoded.

FIG. 5B illustrates an example process flow. The process flow may relate to a method of decoding a layered bitstream, e.g., a bitstream including a base layer and an enhancement layer. In some embodiments, one or more computing devices or components may perform this process flow. In block 552, a video decoder (e.g., 450 of FIG. 4B) receives a content-mapped image in a group of content-mapped images that collectively represent a scene (e.g., in a group of content-mapped images among a series of consecutive content-mapped images in a video sequence) and prediction metadata defining a plurality of polynomials that represents a predictor (e.g., a plurality of polynomials that represent segments of a piece-wise predictor for predicting codewords of a predicted image from mapped codewords in the content-mapped image). The content-mapped image in the group of content-mapped images is generated by an upstream device based at least in part on the content-mapping function and a source image. The prediction metadata specifies an upper limit for mapped codewords in the plurality of polynomials (e.g., an upper limit for mapped codewords for the piece-wise predictor) that is adjusted in response to the upstream device determining that the scene is of a scene category susceptible to object fragmentation in homogeneous region. The homogeneous region may be a region of consistent texture in the source image. Mapped codewords above the upper limit may be clipped to the upper limit.

In block 554, the video decoder (450) generates, based at least in part on the plurality of polynomials with the upper limit (e.g., based at least in part on the piece-wise predictor), a predicted image of a dynamic range higher than a relatively low dynamic range of the content-mapped image.

In block 556, the video decoder (450) generates, based at least in part on the predicted image, a reconstructed frame that represents a reconstructed version of the pre-content-mapped image.

The video decoder (450) may further receive a difference image representing a difference between the predicted image and the source image (e.g., in the enhancement layer), and generate the reconstructed image by combining the predicted image and the residual image.

In an embodiment, the video decoder (450) is further configured to render the reconstructed frame in a display system.

In various example embodiments, an encoder, a decoder, a transcoder, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

11. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
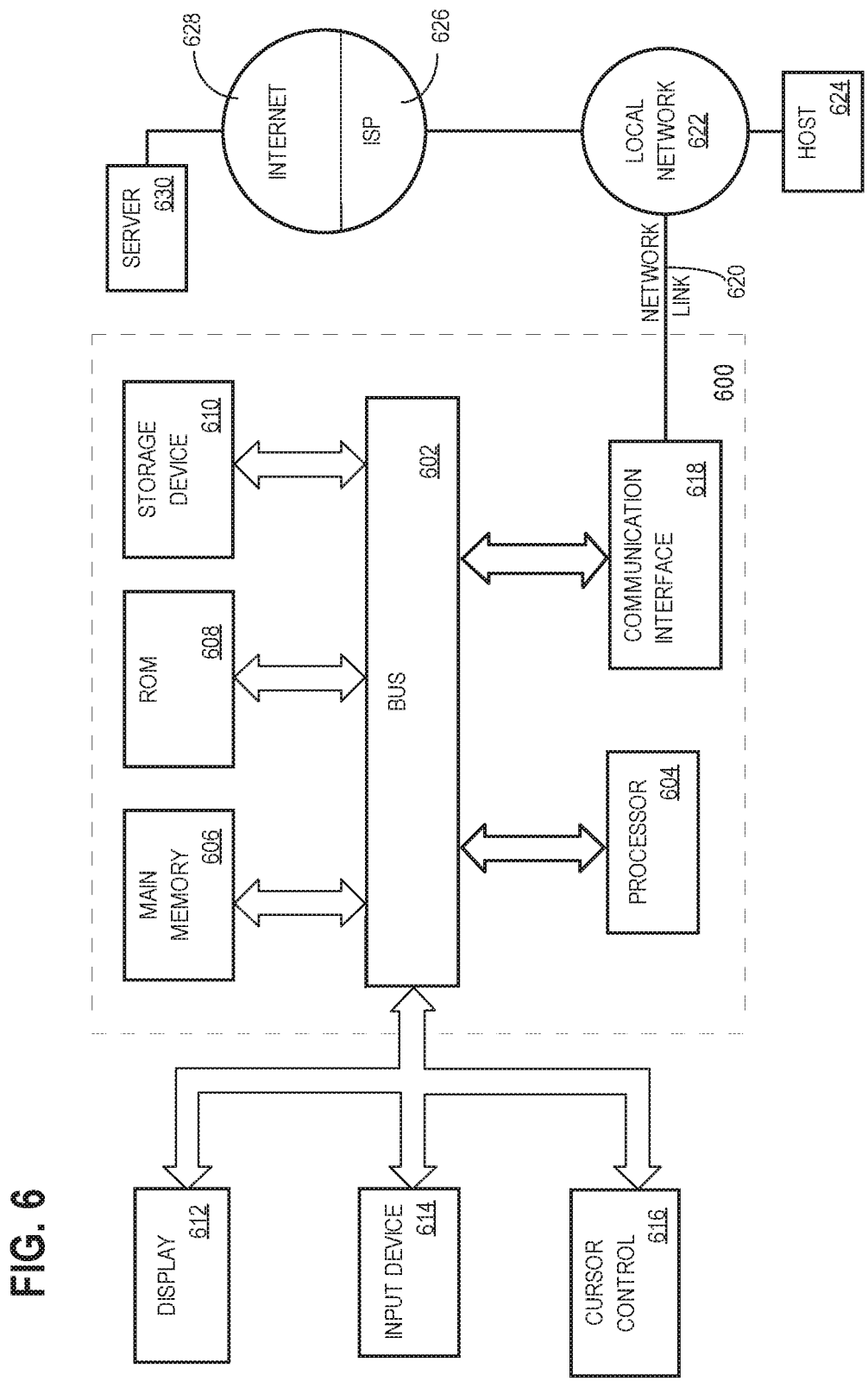
FIG. 6 illustrates an example hardware platform on which a computer or a computing device as described herein may be implemented.

For example, FIG. 6 is a block diagram that illustrates a computer system 600 upon which an example embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a liquid crystal display, for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

12. Equivalents, Extensions, Alternatives and Miscellaneous

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various aspects of the present invention may be appreciated from the following enumerated example embodiments (EEESs):

EEE 1. A method, comprising:
   for each content-mapped image in a group of content-mapped images that collectively represent a scene, determining whether the content-mapped image is of a frame category susceptible to object fragmentation in a homogeneous region based at least in part on one or more statistical values derived from the content-mapped image and a source image that is mapped into the content-mapped image, the source image being of a dynamic range higher than a relatively narrow dynamic range of the content-mapped image;
   based on a count of content-mapped images of the frame category susceptible to object fragmentation in the homogeneous region among the group of content-mapped images, determining whether the scene is of a scene category susceptible to object fragmentation in the homogeneous region;
   in response to determining that the scene is of the scene category susceptible to object fragmentation in the homogeneous region, adjusting an upper limit for mapped codewords in a plurality of polynomials representing a prediction function, the upper limit being selected to prevent object segmentation artifacts in reconstructed images generated by downstream devices.

EEE 2. The method as recited in EEE 1, wherein the one or more statistical values comprise one or more of: a count histogram with bins each of which contains a count of pre-mapped codewords for a mapped codeword, or a distribution of standard deviation values over mapped codewords.

EEE 3. The method as recited in EEE 1, wherein determining whether the content-mapped image is of the frame category susceptible to object fragmentation in the homogeneous region includes determining whether the content-mapped image is a special trim pass frame based at least in part on the one or more statistical values.

EEE 4. The method as recited in EEE 1, further comprising:
   deriving a residual energy histogram from the content-mapped image and the source image;
   locating one or more residual energy peaks in the residual energy histogram;
   based on the one or more residual energy peaks located in the residual energy histogram, classifying the content-mapped image into a frame-level residual energy peak type in a plurality of frame-level residual energy peak types.

EEE 5. The method as recited in EEE 4, wherein the plurality of frame-level residual energy peak types comprises one or more of: a frame type of single residual energy peak in highlight, a frame type of multiple residual energy peaks in highlight, a frame type of one residual energy peak in highlight and one residual energy peak in dark, or a frame type of single residual energy peak in dark.

EEE 6. The method as recited in EEE 1, further comprising classifying the scene into a scene-level residual energy peak type in the plurality of scene-level residual energy peak types based on one or more frame-level residual energy peak types of content-mapped images in the group of content-mapped images.

EEE 7. The method as recited in EEE 6, wherein the plurality of scene-level residual energy peak types comprises one or more of: a scene type of a single residual energy peak in highlight, or a scene type of multiple residual energy peaks in highlight.

EEE 8. The method as recited in EEE 6, wherein the scene-level residual energy peak type corresponds to a frame-level residual energy peak type of a majority of content-mapped images in the group of content-mapped images.

EEE 9. The method as recited in EEE 1, further comprising: determining a noise estimation of homogeneous regions in the scene.

EEE 10. The method as recited in EEE 1, wherein the upper limit is represented by the last pivot point of all pivot points of the plurality of polynomials.

EEE 11. The method as recited in EEE 1, wherein the upper limit is adjusted from a preconfigured value for the plurality of polynomials to a value computed from one or more of: residual energy information as derived from the content-mapped image and the source image, or gradient information as derived from at least one of the content-mapped image or the source image.

EEE 12. The method as recited in EEE 11, wherein the upper limit is further adjusted from the computed value to a nearest preconfigured value below the computed value; and wherein the preconfigured value and the nearest preconfigured value below the computed value belong to a set of preconfigured values defined for the plurality of polynomials.

EEE 13. The method as recited in EEE 1, further comprising computing one or more of a noise measurement in highlight regions of at least one of the content-mapped image or the source image, a noise estimation of the scene, or a histogram of gradients of at least one of the content-mapped image or the source image.

EEE 14. The method as recited in EEE 1, wherein adjusting an upper limit for mapped codewords in a plurality of polynomials representing a predictor includes:
determining whether the scene is of a scene type of single peak in highlight;
in response to determining that the scene is of the scene type of single peak in highlight,
determining whether a noise estimation of the scene exceeds a noise threshold;
in response to determining that the noise estimation of the scene exceeds the noise threshold, adjusting the upper limit to an average gradient peak of the scene.

EEE 15. The method as recited in EEE 1, wherein adjusting an upper limit for mapped codewords in a plurality of polynomials representing a predictor includes:
determining whether the scene is of a scene type of multiple peaks in highlight;
in response to determining that the scene is of the scene type of multiple peaks in highlight,
determining whether the scene is a special trim pass scene;
in response to determining that the scene is a special trim pass scene,
determining a scene-level minimum residual peak based on minimum residual energy peaks of content-mapped images of a frame type of multiple peaks in highlight in the scene;
adjusting the upper limit to a closest mapped codeword at which a residual energy equals a specific percentage of the scene-level minimum residual energy peak, wherein the closest mapped codeword is smaller than a mapped codeword represented by the scene-level minimum residual energy peak.

EEE 16. The method as recited in EEE 1, wherein adjusting an upper limit for mapped codewords in a plurality of polynomials representing a predictor includes:
determining whether the scene is of a scene type of multiple peaks in highlight;
in response to determining that the scene is of the scene type of multiple peaks in highlight, determining whether the scene is a special trim pass scene;
in response to determining that the scene is not a special trim pass scene, adjusting the upper limit to an average of minimum residual energy peaks of content-mapped images of multiple-peaks-in-highlight type in the scene.

EEE 17. The method as recited in EEE 1, wherein the upper limit is represented by a mapped codeword in a luminance-related channel of a color space.

EEE 18. The method as recited in EEE 1, wherein at least one of polynomial parameters defining the plurality of polynomials is dynamically determined while a sequence of content-mapped images including the group of content-mapped images is being processed for generating a multi-layer video signal.

EEE 19. The method as recited in EEE 1, wherein the group of content-mapped images in the scene is encoded into a content mapped video signal represented by one of an 8-bit video signal or a 10-bit video signal.

EEE 20. The method as recited in EEE 19, wherein the content-mapped video signal is generated by at least one of: an advanced video coding (AVC) encoder, a Moving Picture Experts Group (MPEG)-2 encoder, or a High Efficiency Video Coding (HEVC) encoder.

EEE 21. The method as recited in EEE 1, wherein the source image is perceptually encoded.

EEE 22. A method, comprising:
receiving a content-mapped image in a group of content-mapped images that collectively represent a scene and prediction metadata defining a plurality of polynomials that represent a predictor, the content-mapped image in the group of content-mapped images being generated by an upstream device based at least in part on the content-mapping function and a source image of a dynamic range higher than a relatively low dynamic range of the content-mapped image, the prediction metadata specifying an upper limit for mapped codewords in the plurality of polynomials that is adjusted in response to the upstream device determining that the scene is of a scene category susceptible to object fragmentation in homogeneous region;
generating, based at least in part on the plurality of polynomials with the upper limit, a predicted image;
generating, based at least in part on the predicted image, a reconstructed image that represents a reconstructed version of the source image.

EEE 23. The method as recited in EEE 22, further comprising rendering the reconstructed frame in a display system.

EEE 24. An encoder performing any of the methods as recited in EEEs 1-21.

EEE 25. A decoder performing any of the methods as recited in EEEs 22-23.

EEE 26. A system performing any of the methods as recited in EEEs 1-23.

EEE 27. A non-transitory computer readable storage medium, storing software instructions, which when executed by one or more processors cause performance of the method recited in any of EEEs 1-23.

EEE 28. A computing device comprising one or more processors and one or more storage media, storing a set of instructions, which when executed by one or more processors cause performance of the method recited in any of EEEs 1-23.

The invention claimed is:

1. A method of layered encoding, comprising:
for each content-mapped image in a group of content-mapped images among a series of consecutive content-mapped images in a video sequence that collectively represent a scene, determining whether the content-mapped image is of a frame category susceptible to object fragmentation with respect to texture in a homogeneous region based at least in part on one or more statistical values derived from the content-mapped image and a source image that has been mapped into the content-mapped image, the homogeneous region being a region of consistent texture in the source image, the source image being of a dynamic range higher than a relatively narrow dynamic range of the content-mapped image;

wherein the object fragmentation causes visually consistent texture in the homogeneous region of the source image into visually inconsistent texture in a reconstructed image generated from the content-mapped image;

classifying the scene into a scene-level residual energy peak type in a plurality of scene-level residual energy peak types based on one or more frame-level residual energy peak types of content-mapped images in the group of content-mapped images;

based on a count of content-mapped images of the frame category susceptible to the object fragmentation in the homogeneous region among the group of content-mapped images, determining whether the scene is of a scene category susceptible to object fragmentation in the homogeneous region;

in response to determining that the scene is of the scene category susceptible to object fragmentation in the homogeneous region, adjusting an upper limit for mapped codewords for a prediction function for predicting codewords of a predicted image from the mapped codewords in the content-mapped image, mapped codewords above the upper limit being clipped to the upper limit, the upper limit being selected based at least in part on scene-level residual energy peak type to prevent the object fragmentation in the homogeneous region in a reconstructed enhanced dynamic range image generated by downstream devices from a residual image encoded in an enhancement layer of a multi-layer video signal and the content-mapped image encoded in a base layer of the multi-layer video signal, the residual image encoded in the enhancement layer comprising differences between the source images and the predicted image and including the entire homogeneous region.

2. The method as recited in claim 1, wherein the prediction function is a piece-wise prediction function, segments of the piece-wise prediction function being represented by a plurality of polynomials.

3. The method as recited in claim 1, wherein the base layer is encoded with the series of consecutive content-mapped images including the content-mapped image; wherein the enhancement layer is encoded with a series of corresponding consecutive residual images.

4. The method as recited in claim 1, further comprising:
encoding the series of consecutive content-mapped images in the video sequence into a base layer of a multi-layer video signal;

for each content-mapped image in the series of content-mapped images, predicting a predicted image by applying the prediction function to the mapped codewords in the content-mapped image, and computing a difference image between the source image that has been mapped into the content-mapped image and the predicted image; and encoding the computed difference images for the series of content-mapped images as residual images into an enhancement layer of the multi-layer video signal.

5. The method as recited in claim 1, wherein the one or more statistical values comprise one or more of: a count histogram with bins each of which contains a count of pre-mapped codewords for a mapped codeword, or a distribution of standard deviation values over mapped codewords.

6. The method as recited in claim 1, further comprising:
deriving a residual energy histogram from the content-mapped image and the source image, the residual energy histogram indicating, for each mapped codeword in the content-mapped image, the residual energy of all pre-mapped codewords, in the source image, for the mapped codeword;

locating one or more residual energy peaks in the residual energy histogram; based on the one or more residual energy peaks located in the residual energy histogram, classifying the content-mapped image into a frame-level residual energy peak type in a plurality of frame-level residual energy peak types; and adjusting the upper limit for mapped codewords based at least in part on the frame level residual energy peak type of the content-mapped image.

7. The method as recited in claim 6, wherein the plurality of frame-level residual energy peak types comprises one or more of: a frame type of single residual energy peak in highlight, a frame type of multiple residual energy peaks in highlight, a frame type of one residual energy peak in highlight and one residual energy peak in dark, or a frame type of single residual energy peak in dark.

8. The method as recited in claim 1, wherein the scene-level residual energy peak type corresponds to a frame-level residual energy peak type of a majority of content-mapped images in the group of content-mapped images.

9. The method as recited in claim 2, wherein the upper limit is represented by the last pivot point of all pivot points of the plurality of polynomials, the segments of the piece-wise prediction function being delimited by respective adjacent ones among the pivot points.

10. The method as recited in claim 2, wherein the upper limit is adjusted from a preconfigured value for the plurality of polynomials to a value computed from one or more of: residual energy information as derived from the content-mapped image and the source image, or gradient information as derived from at least one of the content-mapped image or the source image.

11. The method as recited in claim 10, wherein the upper limit is further adjusted from the computed value to a nearest preconfigured value below the computed value; and wherein the preconfigured value and the nearest preconfigured value below the computed value belong to a set of preconfigured values defined for the plurality of polynomials.

12. The method as recited in claim 1, wherein adjusting an upper limit for mapped codewords in a plurality of polynomials representing a predictor includes:
determining whether the scene is of a scene type of single peak in highlight;

in response to determining that the scene is of the scene type of single peak in highlight, determining whether a noise estimation of the scene exceeds a noise threshold; in response to determining that the noise estimation of the scene exceeds the noise threshold, adjusting the upper limit to the average value of mapped codewords for which a gradient peak is attained in the content-mapped images.

13. The method as recited in claim 1, wherein the upper limit is represented by a mapped codeword in a luminance-related channel of a color space.

14. A method, comprising:
receiving, from a base layer of a multi-layer signal, a content-mapped image in a group of content-mapped images among a series of consecutive content-mapped images in a video sequence that collectively represent a scene and prediction metadata defining a plurality of polynomials that represent segments of a piece-wise predictor for predicting codewords of a predicted image from mapped codewords in the content-mapped image, the content-mapped image in the group of content-mapped images being generated by an upstream device based at least in part on a content-mapping function and a source image of a dynamic range higher than a relatively low dynamic range of the content-mapped image, the prediction metadata specifying an upper limit for mapped codewords for the piece-wise predictor that is adjusted in response to the upstream device determining that the scene is of a scene category susceptible to object fragmentation in a homogeneous region, the homogeneous region being a region of consistent texture in the source image;

wherein the object fragmentation causes visually consistent texture in the homogeneous region of the source image into visually inconsistent texture in a reconstructed image generated from the content-mapped image;

the scene having been classified by the upstream device into a scene-level residual energy peak type in a plurality of scene-level residual energy peak types based on one or more frame-level residual energy peak types of content-mapped images in the group of content-mapped images;

the upper limit having been selected by the upstream device based at least in part on the scene-level residual energy peak;

generating, based at least in part on the piece-wise predictor with the upper limit, a predicted image, mapped codewords above the upper limit being clipped to the upper limit;

generating, based at least in part on the predicted image and a residual image received from an enhancement layer of the multi-layer signal, a reconstructed enhanced dynamic range image that represents a reconstructed version of the source image, wherein the residual image received from the enhancement layer of the multi-layer signal comprises differences between the source image and the predicted image including the entire homogeneous region.

15. The method as recited in claim 14, further comprising:

generating the reconstructed enhanced dynamic range image by combining the predicted image and the residual image.

\* \* \* \* \*